United States Patent
Yamazaki

(10) Patent No.: US 12,370,971 B2
(45) Date of Patent: Jul. 29, 2025

(54) IMPACT ABSORPTION DEVICE

(71) Applicant: Daicel Corporation, Osaka (JP)

(72) Inventor: Masayuki Yamazaki, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/717,431

(22) PCT Filed: Sep. 6, 2022

(86) PCT No.: PCT/JP2022/033457
§ 371 (c)(1),
(2) Date: Jun. 7, 2024

(87) PCT Pub. No.: WO2023/105866
PCT Pub. Date: Jun. 15, 2023

(65) Prior Publication Data
US 2025/0018893 A1    Jan. 16, 2025

(30) Foreign Application Priority Data
Dec. 10, 2021    (JP) .................................. 2021-200920

(51) Int. Cl.
*B60R 21/04* (2006.01)
*B60R 21/02* (2006.01)

(52) U.S. Cl.
CPC ...... *B60R 21/04* (2013.01); *B60R 2021/0273* (2013.01)

(58) Field of Classification Search
CPC . B60R 2021/0273; B60R 21/04; B60R 21/02; B60R 2019/1893;
(Continued)

(56) References Cited

U.S. PATENT DOCUMENTS 4,046,361 A * 9/1977 Morse .................... B60R 19/04
267/139
10,046,723 B1    8/2018 Faruque et al.
(Continued)

FOREIGN PATENT DOCUMENTS

JP    2002193169 A * 7/2002 .............. B62J 17/02
JP    2003097623 A * 4/2003 ............. B60R 21/04
(Continued)

OTHER PUBLICATIONS

International Search Report (PCT/ISA/210) issued Oct. 11, 2022 in International Patent Application No. PCT/JP2022/033457 with English translation thereof.
(Continued)

*Primary Examiner* — Paul N Dickson
*Assistant Examiner* — Matthew D Lee
(74) *Attorney, Agent, or Firm* — XSENSUS LLP

(57) ABSTRACT

The impact absorption device includes an impact absorbing member and an auxiliary member. The impact absorbing member is attached to an installation surface of a base portion rotatably about a first pivoting axis extending in a first direction and is reversibly switched between a retracted state and a protruding state, and the auxiliary member is attached rotatably about a second pivoting axis and is reversibly switched between a retracted state and a protruding state. A height of the impact absorbing member from the base portion in the protruding state is higher than that of the auxiliary member. In the protruding state, at least a portion of the impact absorbing member and at least a portion of the auxiliary member face each other, and the impact absorbing member deforms when receiving a load including a component in a direction opposite to the base portion, thereby engaging with the auxiliary member.

14 Claims, 22 Drawing Sheets

(58) Field of Classification Search
CPC ...... B60R 2021/0414; B60R 2019/262; B60R 21/08; F16F 2234/06; F16F 7/00
See application file for complete search history.

(56) References Cited

U.S. PATENT DOCUMENTS

| | | | | |
|---|---|---|---|---|
| 2003/0030296 A1* | 2/2003 | Fox | ..................... | B60R 21/04 296/39.1 |
| 2005/0212328 A1* | 9/2005 | Ashmead | ................... | F16F 7/12 296/187.05 |
| 2005/0230205 A1* | 10/2005 | Springler | ................ | F16F 7/121 188/377 |
| 2006/0065499 A1* | 3/2006 | Smaldone | ............ | A43B 13/183 267/141 |
| 2007/0228746 A1* | 10/2007 | Cormier | .................. | B60R 19/18 293/102 |
| 2014/0117714 A1* | 5/2014 | Kwon | ..................... | B60R 21/04 296/187.05 |
| 2017/0334368 A1* | 11/2017 | Faruque | ............ | B60R 21/23138 |
| 2023/0105662 A1 | 4/2023 | Yamazaki | | |

FOREIGN PATENT DOCUMENTS

| | | | | |
|---|---|---|---|---|
| JP | 2016011065 | A | * | 1/2016 |
| JP | 7346213 | B2 | * | 9/2023 |
| WO | 2021/251058 | A1 | | 12/2021 |
| WO | WO-2024046627 | A1 | * | 3/2024 |
| WO | WO-2024242131 | A1 | * | 11/2024 |

OTHER PUBLICATIONS

Written Opinion of the International Searching Authority (PCT/ISA/237) issued Oct. 11, 2022 in International Patent Application No. PCT/JP2022/033457 with English translation thereof.

* cited by examiner

IMPACT ABSORPTION DEVICE

CROSS-REFERENCE TO RELATED APPLICATIONS

The present application is based on PCT filing PCT/JP2022/033457, filed Sep. 6, 2022, which claims priority from Japanese Patent Application No. 2021-200920, filed Dec. 10, 2021, the entire contents of each are incorporated herein by reference.

TECHNICAL FIELD

The present disclosure relates to an impact absorption device that relieves an impact when activated.

BACKGROUND ART

In the related art, a technology for relieving an impact caused by an accident or the like is known. For example, Patent Document 1 describes an energy absorber for protecting a pedestrian or the like colliding with a bumper of a vehicle by relieving an impact generated on the bumper of the vehicle. In this energy absorber, respective gaps between a plurality of fins connected to a base and absorbing an impact are formed.

CITATION LIST

Patent Document

Patent Document 1: U.S. Pat. No. 10,046,723

SUMMARY OF INVENTION

Technical Problem

In an impact absorption device, a region where an impact absorbing member can flex needs to be formed. For example, in the energy absorber described in Patent Document 1, the respective gaps between the plurality of fins correspond to such a region. The impact absorption device has a bulky structure as a whole when this region is formed, and thus the position of the impact absorption device to be mounted on the vehicle is limited, and a degree of freedom of an arrangement position thereof is reduced.

In view of the problems described above, an object of the present disclosure is to provide an impact absorption device capable of improving a degree of freedom of an arrangement position thereof.

Solution to Problem

To solve the problems described above, the present disclosure adopts the following configuration.

An impact absorption device configured to relieve an impact when activated includes an impact absorbing member, an auxiliary member, and a drive unit. The impact absorbing member has flexibility and is attached to a base portion in a manner reversibly switchable between a retracted state in which the impact absorbing member is retracted toward an installation surface of the base portion and a protruding state in which the impact absorbing member protrudes from the installation surface. The auxiliary member has flexibility and is attached to the base portion in a manner reversibly switchable between a retracted state in which the auxiliary member is retracted toward the installation surface and a protruding state in which the auxiliary member protrudes from the installation surface in synchronization with the retracted state and the protruding state of the impact absorbing member. The drive unit is configured to directly or indirectly drive the impact absorbing member when the impact absorbing member and the auxiliary member are activated, thereby switching the impact absorbing member at least from the retracted state to the protruding state. The impact absorbing member is attached to the installation surface of the base portion rotatably about a first pivoting axis extending in a first direction, and is reversibly switched between the retracted state and the protruding state by being rotationally driven about the first pivoting axis. The auxiliary member is attached to the installation surface rotatably about a second pivoting axis extending in a second direction intersecting the first direction, and is reversibly switched between the retracted state and the protruding state by being rotationally driven about the second pivoting axis. A height of the impact absorbing member from the base portion in the protruding state is higher than that of the auxiliary member. In the protruding state, at least a portion of the impact absorbing member and at least a portion of the auxiliary member face each other, and the impact absorbing member deforms when receiving a load including a component in a direction opposite to the installation surface side of the base portion, thereby engaging with the auxiliary member.

In the impact absorption device described above, the auxiliary member may restrict the impact absorbing member from rotating about the first pivoting axis and switching to the retracted state when the impact absorbing member receives the load in the protruding state.

In the impact absorption device described above, the impact absorbing member may include a first groove formed at a position facing the auxiliary member in the protruding state and engageable with a portion of the auxiliary member, and at least a portion of the impact absorbing member may deform toward the auxiliary member when the impact absorbing member receives the load, thereby causing the first groove to engage with a portion of the auxiliary member.

In the impact absorption device described above, the auxiliary member may include a protruding portion formed at a position facing the first groove in the protruding state and protruding in the second direction, and the auxiliary member may deform in the first direction when the auxiliary member receives the load, thereby causing the protruding portion to engage with the first groove.

In the impact absorption device described above, a portion of the impact absorbing member may deform into a protruding shape in the second direction when the impact absorbing member receives the load, the second direction being predetermined, and the auxiliary member may include a second groove engageable with the impact absorbing member by being deformed and sandwiching the portion of the impact absorbing member deformed into the protruding shape when receiving the load.

In the impact absorption device described above, the impact absorbing member may include a deformation support portion formed in the first direction, causing deformation to preferentially occur in the second direction when the impact absorbing member receives the load.

In the impact absorption device described above, the impact absorbing member may have greater flexibility than that of the auxiliary member.

In the impact absorption device described above, the impact absorbing member may include a plurality of impact absorbing members disposed in a plurality of columns, the plurality of impact absorbing members being spaced apart in a direction orthogonal to the first direction, and each of the plurality of impact absorbing members provided in the plurality of columns may be maintained in a lying posture along the installation surface in the retracted state, rotationally driven in a predetermined activating direction about the first pivoting axis and switched from the lying posture to a standing posture in which the impact absorbing member is erected from the installation surface, when being switched from the retracted state to the protruding state, and rotationally driven in a standing-to-lying direction opposite to the activating direction about the first pivoting axis and switched from the standing posture to the lying posture, when being switched from the protruding state to the retracted state.

In the impact absorption device described above, the auxiliary member may be disposed between each column of the plurality of impact absorbing members of the plurality of columns, maintained in a lying posture along the installation surface in the retracted state, with a portion of an impact absorbing member of the plurality of impact absorbing members in an adjacent column covering, from above, at least a portion of the auxiliary member, rotationally driven in a predetermined activating direction about the second pivoting axis and switched from the lying posture to a standing posture, when being switched from the retracted state to the protruding state, and rotationally driven in the standing-to-lying direction opposite to the activating direction about the second pivoting axis and switched from the standing posture to the lying posture, when being switched from the protruding state to the retracted state.

In the impact absorption device described above, the auxiliary member may face, of the plurality of impact absorbing members, impact absorbing members in adjacent columns on both sides, in the protruding state.

The impact absorption device described above may further include one or more driving force transmitting members coupled to the auxiliary member, at least partially having flexibility, and driven by the drive unit, and the one or more driving force transmitting members may be driven when the drive unit activates the impact absorbing member, thereby causing the auxiliary member to switch from the lying posture to the standing posture, and the impact absorbing member to switch from the lying posture to the standing posture, accompanying the auxiliary member.

The impact absorption device described above may include a plurality of the auxiliary members and one of the driving force transmitting members, and the plurality of auxiliary members may be coupled to the driving force transmitting member.

In the impact absorption device described above, the one or more driving force transmitting members may each include a plate-shaped portion and may be driven by the drive unit while maintaining a state in which the plate-shaped portion is parallel to the installation surface.

In the impact absorption device described above, the first direction and the second direction may be orthogonal to each other.

Advantageous Effects of Invention

According to the technique of the present disclosure, a degree of freedom of an arrangement position of the impact absorption device can be improved.

DESCRIPTION OF EMBODIMENTS

Hereinafter, an impact absorption device according to an embodiment of the present disclosure will be described with reference to the drawings. Note that the respective configurations, the combinations thereof, and the like in the respective embodiments are only examples, and the configurations may be added, omitted, substituted, or otherwise modified as appropriate within a scope that does not depart from the spirit of the present disclosure. The present disclosure is not limited by the embodiments and is limited only by the claims.

First Embodiment

An impact absorption device according to a first embodiment will now be described. The impact absorption device according to the present embodiment is mounted on a vehicle such as an automobile, and is exemplified as a device for protecting an occupant in the vehicle. The impact absorption device is attached to an attachment target which constitutes the vehicle and protects the occupant when activated. Note that examples of the attachment target which constitutes the vehicle include a structure which constitutes the vehicle body such as a pillar or a ceiling, and a structure which constitutes the vehicle body such as a dashboard or a steering wheel. The impact absorption device is fixed to the vehicle by being attached to such an attachment target. Note that a base portion itself may be the attachment target itself, or an impact absorbing portion 12 or the like described below may be directly provided to the attachment target.

Figure 1A:
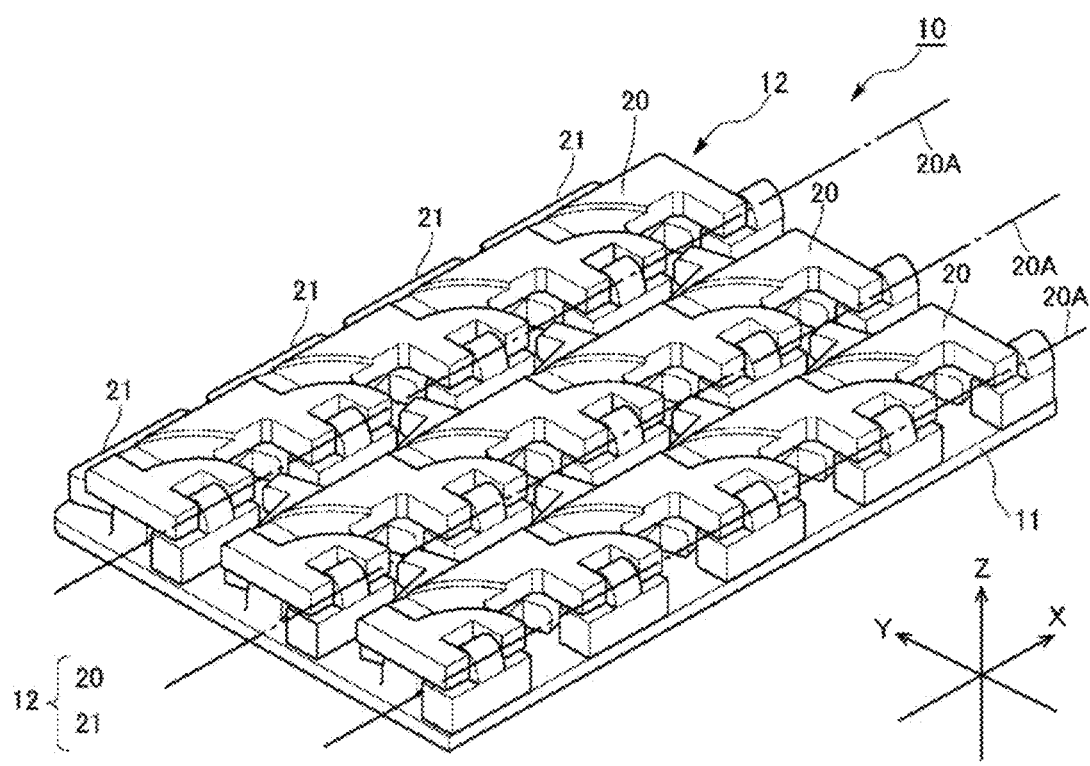
FIG. 1A is an external perspective view (part 1) schematically illustrating an impact absorption device according to a first embodiment.
Figure 1B:
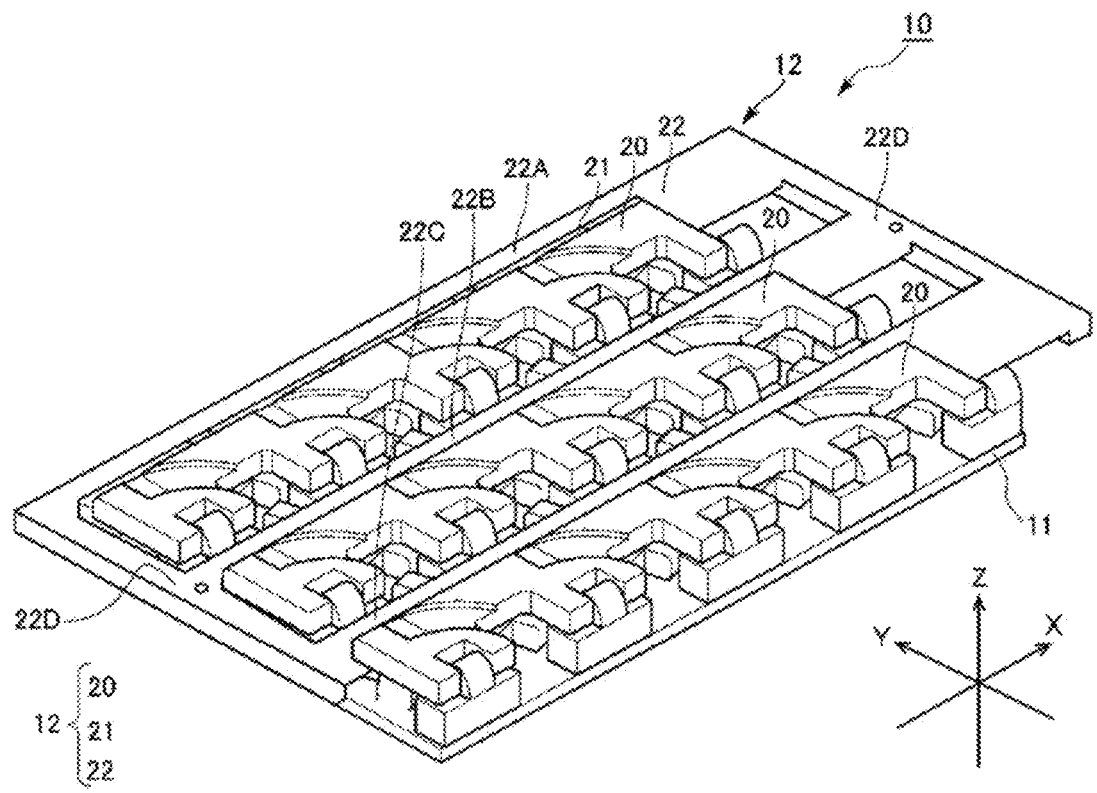
FIG. 1B is an external perspective view (part 2) schematically illustrating the impact absorption device according to the first embodiment.
Figure 2A:
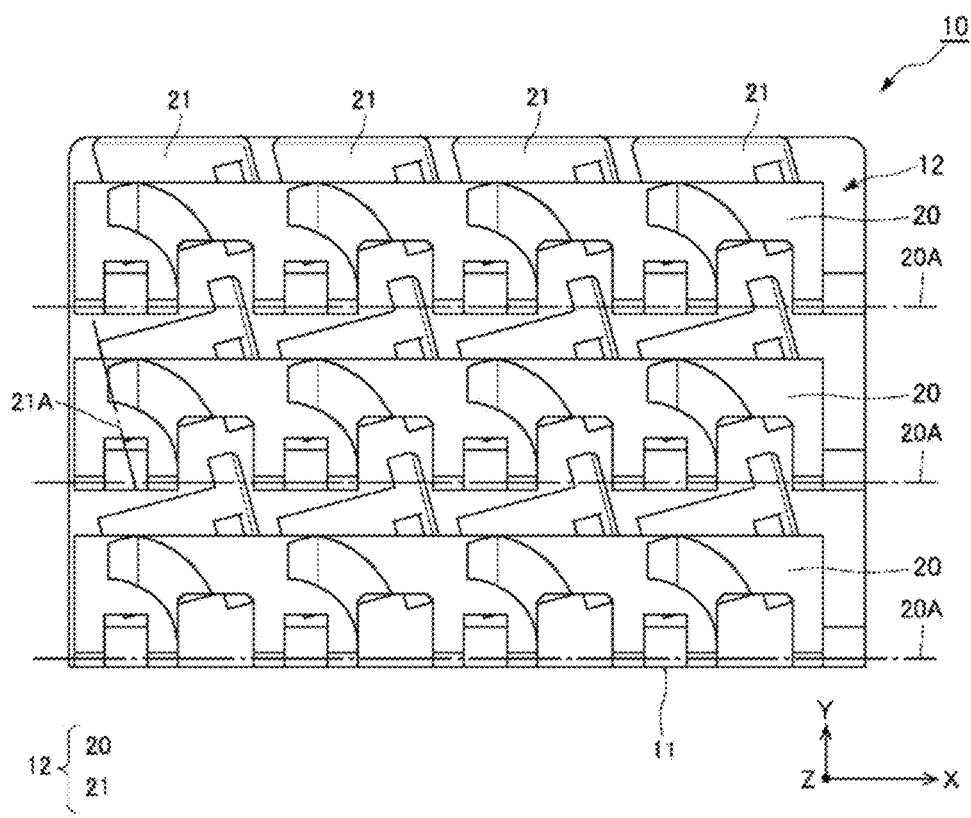
FIG. 2A is a plan view (part 1) schematically illustrating the impact absorption device according to the first embodiment.
Figure 2B:
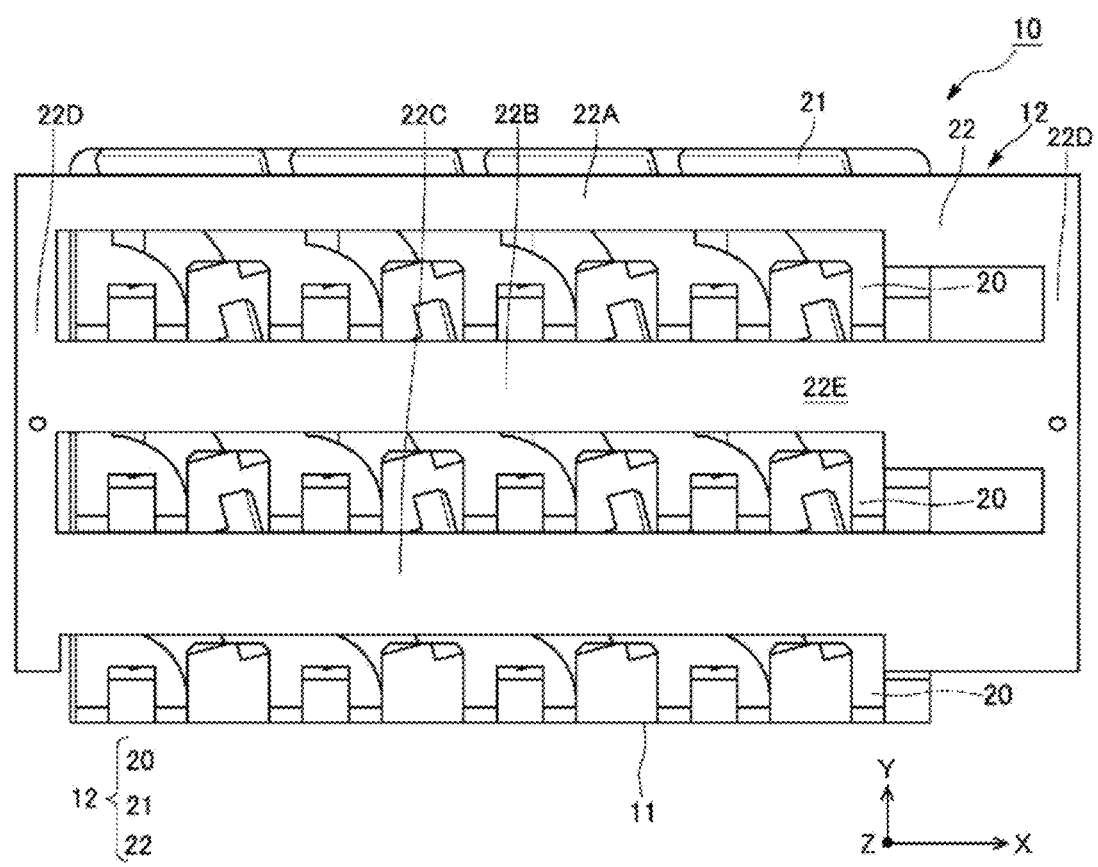
FIG. 2B is a plan view (part 2) schematically illustrating the impact absorption device according to the first embodiment.

Next, an impact absorption device 10 according to the present embodiment will be described in detail with reference to FIGS. 1A to 2B. FIGS. 1A and 1B are perspective views schematically illustrating an appearance of the impact absorption device 10 according to the present embodiment. FIGS. 2A and 2B are plan views schematically illustrating the appearance of the impact absorption device 10 according to the present embodiment. The impact absorption device 10 includes a base portion 11 attached to an attachment target of a vehicle, and the impact absorbing portion 12 attached to a front surface (an example of an "installation surface") side of the base portion 11. The base portion 11 has a rectangular plate-like shape, and the impact absorbing portion 12 is arranged on the front surface side of the base portion 11, and a back surface side thereof is attached to an attachment target. Hereinafter, as illustrated in FIGS. 1A to 2B, a direction along a long side of the base portion 11 is defined as an X-axis, a direction along a short side of the base portion 11 is defined as a Y-axis, and a direction orthogonal to both the X-axis and the Y-axis (direction orthogonal to the front surface and the back surface of the base portion) is defined as a Z-axis. The impact absorption device 10 is a device for protecting an occupant to be protected and positioned in the Z-axis direction. Note that the direction along the X-axis is defined as a "row" of the matrix, and the direction along the Y-axis is defined as a "column" of the matrix.

The impact absorbing portion 12 has flexibility as a whole, and absorbs a force (load) applied to an occupant by deforming when an accident or the like occurs in a vehicle and an inertial force is generated on the occupant, causing the occupant to collide with the impact absorbing portion 12. Thus, the impact absorbing portion 12 relieves the impact on the occupant and protects the occupant. The impact absorbing portion 12 is configured to protrude toward a cabin occupied by the occupant. More specifically, the impact absorbing portion 12 is configured to be reversibly switchable between a retracted state in which the impact absorbing portion 12 is retracted from the cabin toward the base portion 11 and a protruding state in which the impact absorbing portion 12 protrudes from the base portion 11 toward the cabin. In the state illustrated in FIGS. 1A to 2B, the impact absorbing portion 12 is in the retracted state.

The impact absorbing portion 12 includes an impact absorbing member 20, a fin 21 (an example of an "auxiliary member"), and a top plate portion 22 (an example of a "driving force transmitting member"). Note that, in FIGS. 1A and 2A, the top plate portion 22 is not illustrated for description.

The impact absorbing member 20 is formed of rubber or the like and has deformable flexibility such as elasticity. The impact absorbing member 20 has a shape in which the direction in the X-axis direction is a longitudinal direction (shape extending integrally in the X-axis direction), and three impact absorbing members 20 are arranged in three columns in the Y-axis direction. The impact absorbing member 20 is attached to the front surface side of the base portion 11 rotatably about a pivoting axis 20A (an example of a "first pivoting axis") extending in a direction (an example of a "first direction") along the X-axis with respect to the front surface of the base portion 11. In FIGS. 1A and 2A, the pivoting axis 20A is represented by a dashed line. Respective pivoting axes 20A of the three impact absorbing members 20 are spaced apart from each other in a direction along the Y-axis (an example of a "second direction"), making it possible for each impact absorbing member 20 to operate without interfering with each other. Note that, hereinafter, three impact absorbing members provided in three columns may be referred to as a plurality of columns of impact absorbing members 20. Thus, the impact absorbing portion 12 includes the plurality of columns of impact absorbing members 20.

Each of the plurality of columns of impact absorbing members 20 is maintained in a lying posture along the front surface of the base portion 11 in the retracted state, as illustrated in FIG. 1A. Each of the plurality of columns of impact absorbing members 20 is rotationally driven in an activating direction about the pivoting axis 20A when being switched from the retracted state to the protruding state, and thus switches from the lying posture to a standing posture in which the impact absorbing member 20 is erected from the front surface of the base portion 11. The activating direction of the impact absorbing member 20 is clockwise when viewed toward the positive direction of the X-axis. When being switched from the protruding state to the retracted state, each of the plurality of columns of impact absorbing members 20 is rotationally driven in a standing-to-lying direction opposite to the activating direction about the pivoting axis 20A and thus switches from the standing posture to the lying posture. The standing-to-lying direction of the impact absorbing member 20 is counterclockwise when viewed toward the positive direction of the X-axis. As described above, each of the plurality of columns of impact absorbing members 20 is configured to be reversibly switchable between the retracted state and the protruding state.

Solution to Problem

The fin 21 is formed of rubber or the like and has deformable flexibility such as elasticity. The fin 21 erects the impact absorbing member 20 by transmitting power from a drive unit to the impact absorbing member 20. The drive unit can drive the impact absorbing member 20 indirectly by driving the fin 21. In the present embodiment, four fins 21 are arranged for one impact absorbing member 20. That is, a total of twelve fins 21 are arranged in four rows in the direction along the X-axis and in three columns in the direction along the Y-axis. A plurality of the fins 21 are attached to the front surface of the base portion 11 about a pivoting axis 21A (an example of a "second pivoting axis") that intersects the pivoting axis 20A. In FIG. 2A, the pivoting axis 21A of the fin 21 in the second row and the first column is indicated by a dashed line. Note that the pivoting axes 21A of the fins 21 are parallel to each other. The plurality of fins 21 are rotatable about the respective pivoting axes 21A.

In the retracted state, each of the plurality of fins 21 is maintained in a lying posture along the front surface of the base portion 11, with a portion of the impact absorbing member 20 to be erected covering at least a portion of the fin 21 from above. Note that each of the plurality of fins 21 erects the impact absorbing member 20 arranged in the same column. Each of the plurality of fins 21, when being switched from the retracted state to the protruding state, is rotationally driven in an activating direction about the pivoting axis 21A and thus switches from the lying posture to a standing posture. The activating direction of the fin 21 is counterclockwise when viewed toward the positive direction of the Y-axis. Each of the plurality of fins 21, when being switched from the protruding state to the retracted state, is rotationally driven in a standing-to-lying direction opposite to the activating direction about the pivoting axis 21A and thus switches from the standing posture to the lying posture. The standing-to-lying direction of the fin 21 is clockwise when viewed toward the positive direction of the Y-axis. When the fin 21 is switched from the lying posture to the standing posture, the impact absorbing member 20 to be erected is pushed up, making it possible to rotate the impact absorbing member 20 in the activating direction of the pivoting axis 20A. Note that the angle formed by the pivoting axis 20A of the impact absorbing member 20 and the pivoting axis 21A of the fin 21 is preferably an acute angle, not a right angle. Note that the fin 21 can be reversibly switched between the retracted state and the protruding state in synchronization with the retracted state and the protruding state of the impact absorbing member 20.

The top plate portion 22 illustrated in FIGS. 1B and 2B is made of rubber or the like and has flexibility. The top plate portion 22 is provided to transmit power from the drive unit to each fin 21 by being driven by the drive unit. The top plate portion 22 includes coupling portions 22A to 22C, each coupled to the fins 21 in the same row, that is, the fins 21 for erecting the same impact absorbing member 20. Each of the coupling portions 22A to 22C has a shape having a longitudinal direction along the X-axis. The coupling portion 22A is coupled to the fins 21 in the first column. The coupling portion 22B is coupled to the fins 21 in the second column. The coupling portion 22C is coupled to the fins 21 in the third column. Thus, the top plate portion 22 is coupled to all fins 21.

The top plate portion 22 includes a pair of connecting portions 22D which connect and integrate the respective coupling portions 22A to 22C. The connecting portions 22D connect the respective coupling portions 22A to 22C at both ends in the direction along the X-axis. Thus, the top plate portion 22 can transmit the power of the drive unit to all the fins 21. In this way, in the present embodiment, the impact absorbing portion 12 includes a single top plate portion 22 in which the coupling portions 22A, 22B, 22C and the connecting portions 22D are integrally formed.

When the drive unit of the impact absorption device 10 activates the impact absorbing portion 12, the top plate portion 22 is driven to switch the fins 21 from the lying posture to the standing posture, and each impact absorbing member 20 is switched from the lying posture to the standing posture accompanying the fins 21. Thus, the impact absorption device 10 according to the present embodiment can switch the impact absorbing portion 12 from the retracted state to the protruding state when the impact absorbing portion 12 is activated by the drive unit.

Figure 3A:
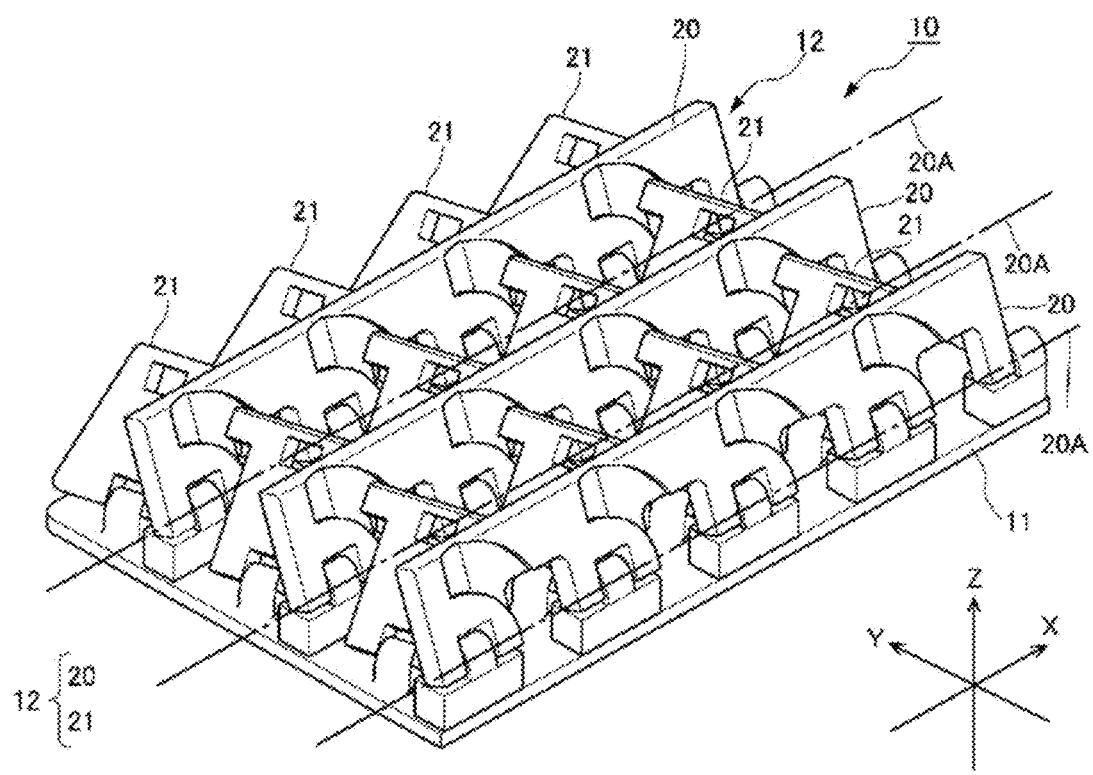
FIG. 3A is an external perspective view (part 3) schematically illustrating the impact absorption device according to the first embodiment.
Figure 3B:
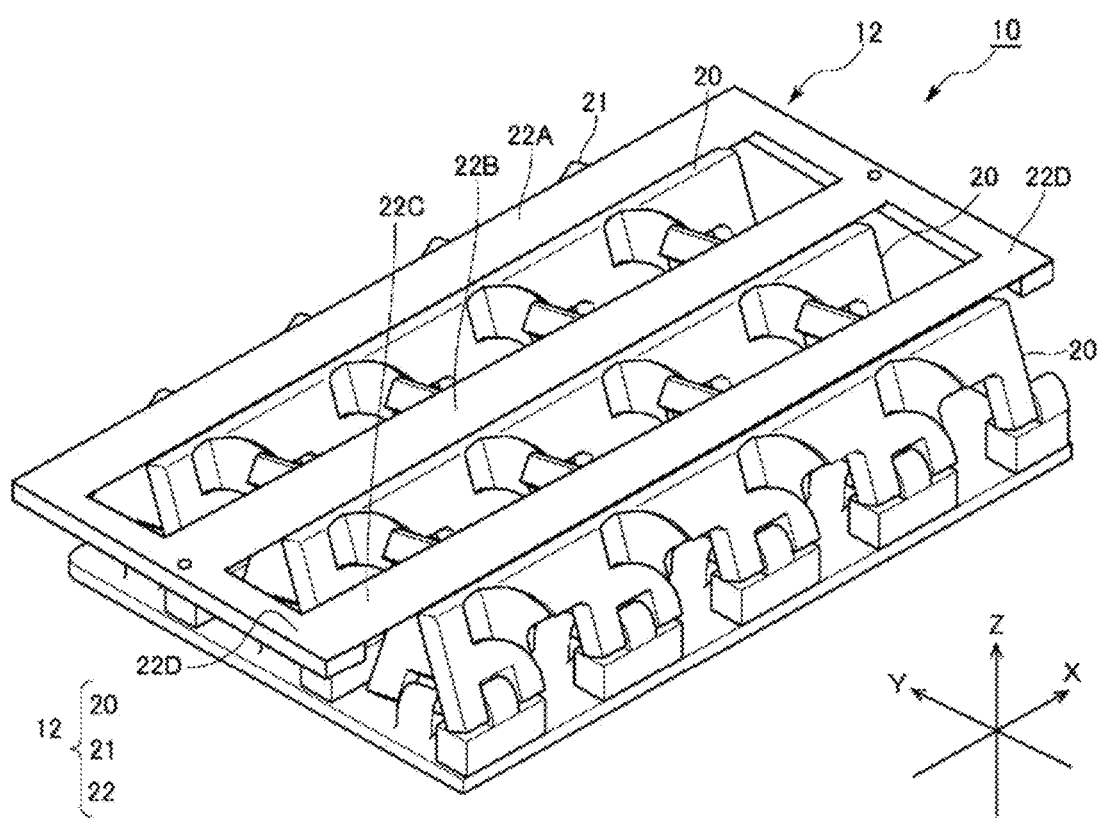
FIG. 3B is an external perspective view (part 4) schematically illustrating the impact absorption device according to the first embodiment.
Figure 4A:
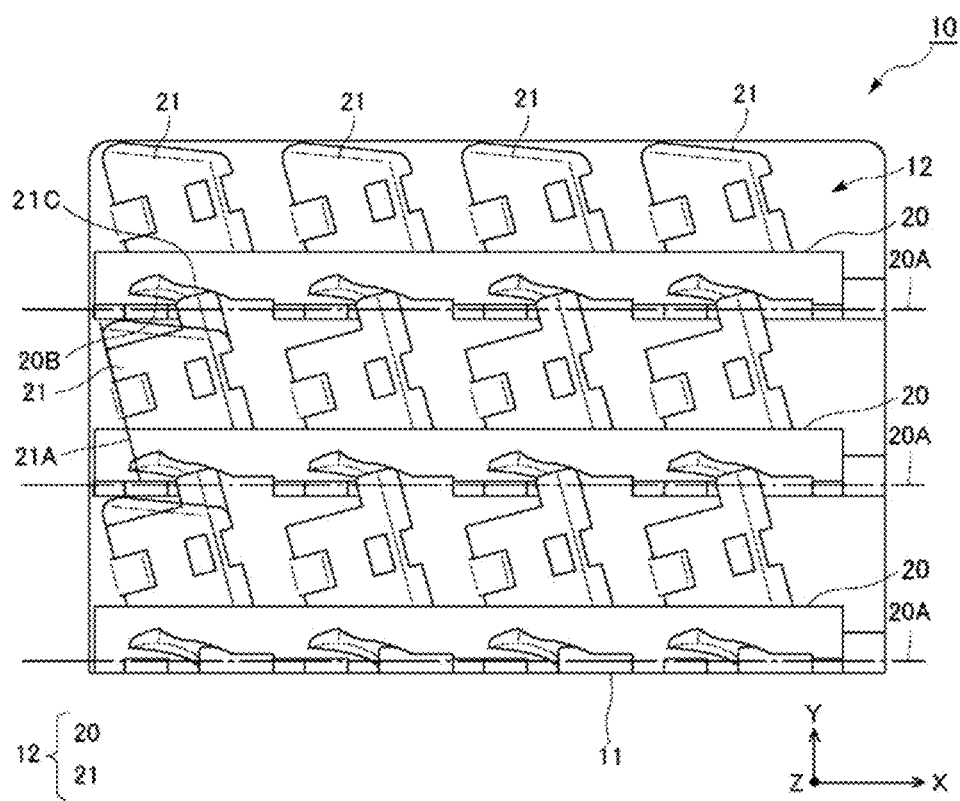
FIG. 4A is a plan view (part 3) schematically illustrating the impact absorption device according to the first embodiment.
Figure 4B:
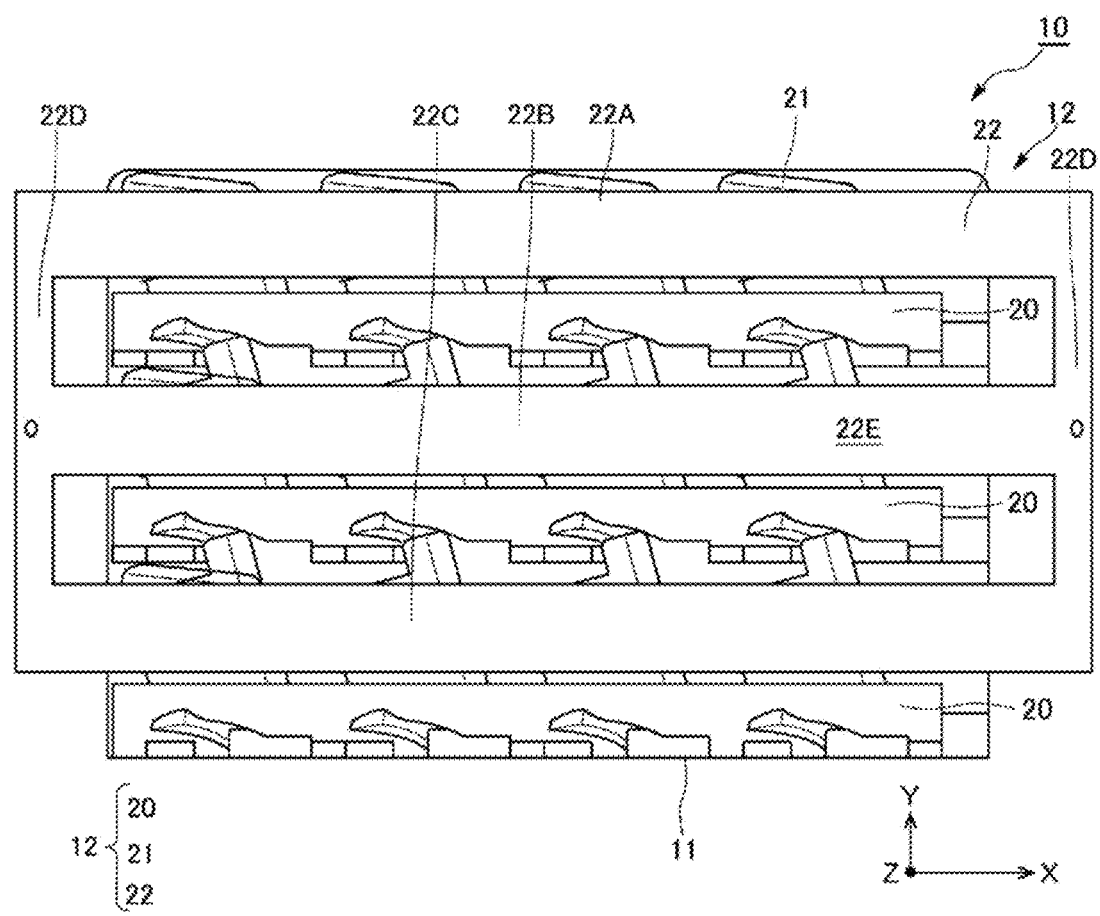
FIG. 4B is a plan view (part 4) schematically illustrating the impact absorption device according to the first embodiment.
Figure 5A:
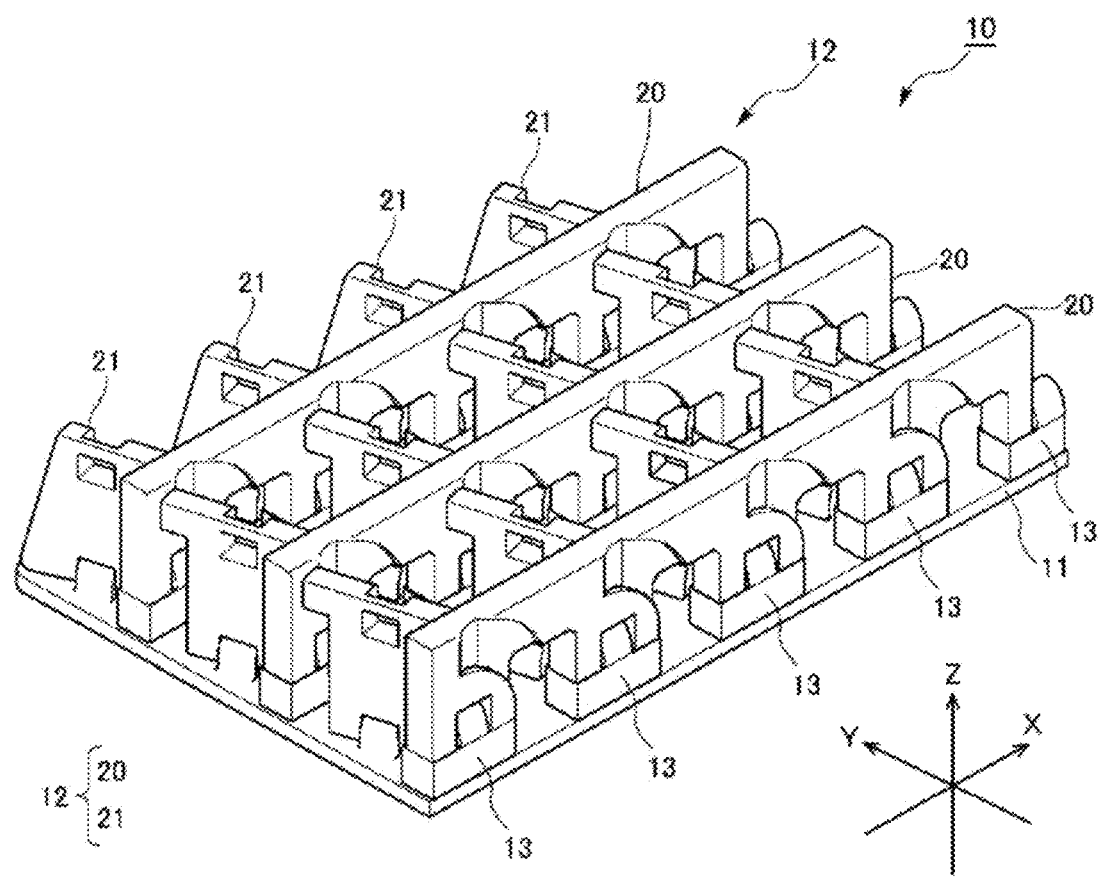
FIG. 5A is an external perspective view (part 5) schematically illustrating the impact absorption device according to the first embodiment.
Figure 5B:
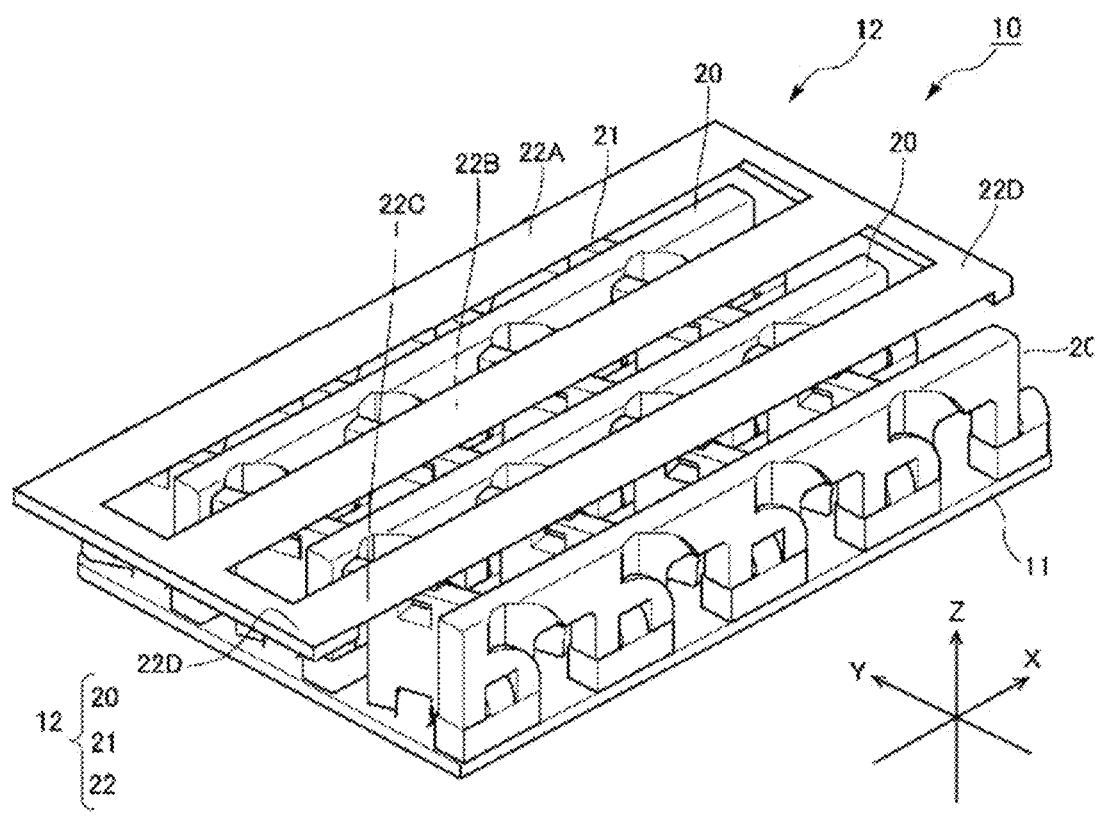
FIG. 5B is an external perspective view (part 6) schematically illustrating the impact absorption device according to the first embodiment.
Figure 6A:
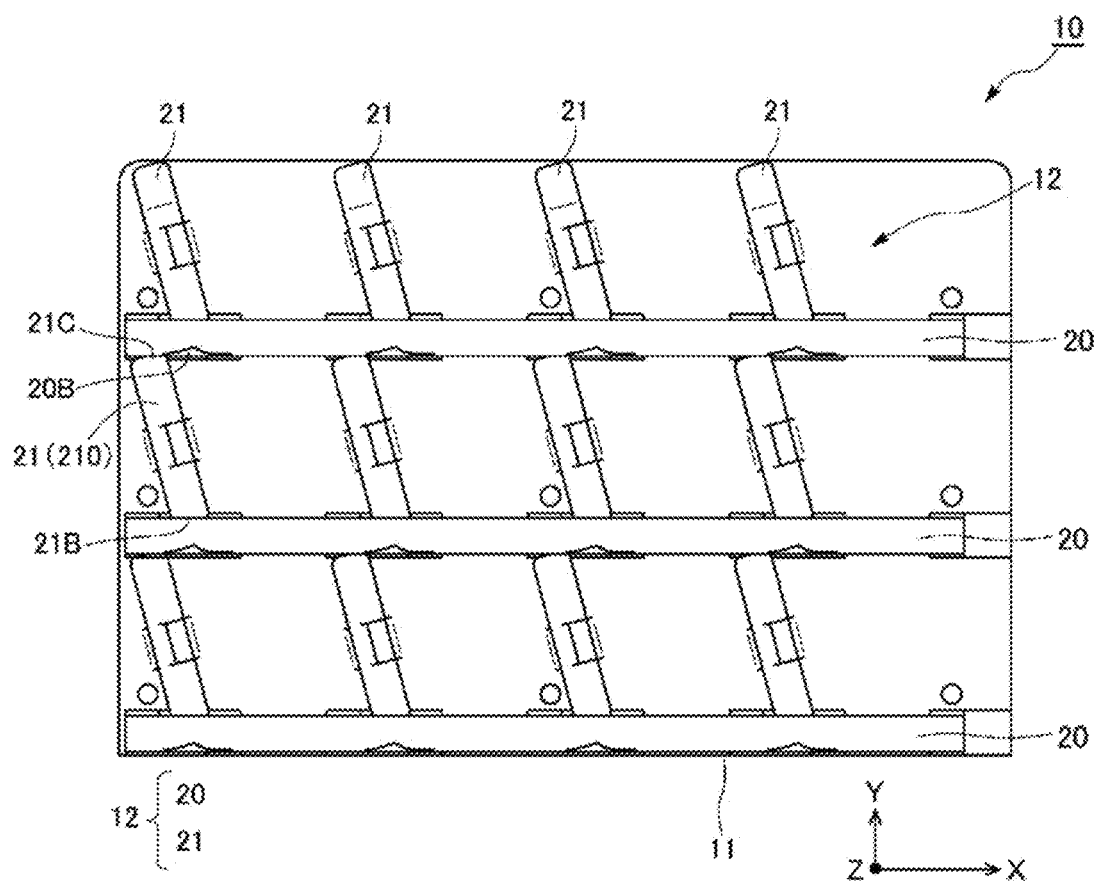
FIG. 6A is a plan view (part 5) schematically illustrating the impact absorption device according to the first embodiment.
Figure 6B:
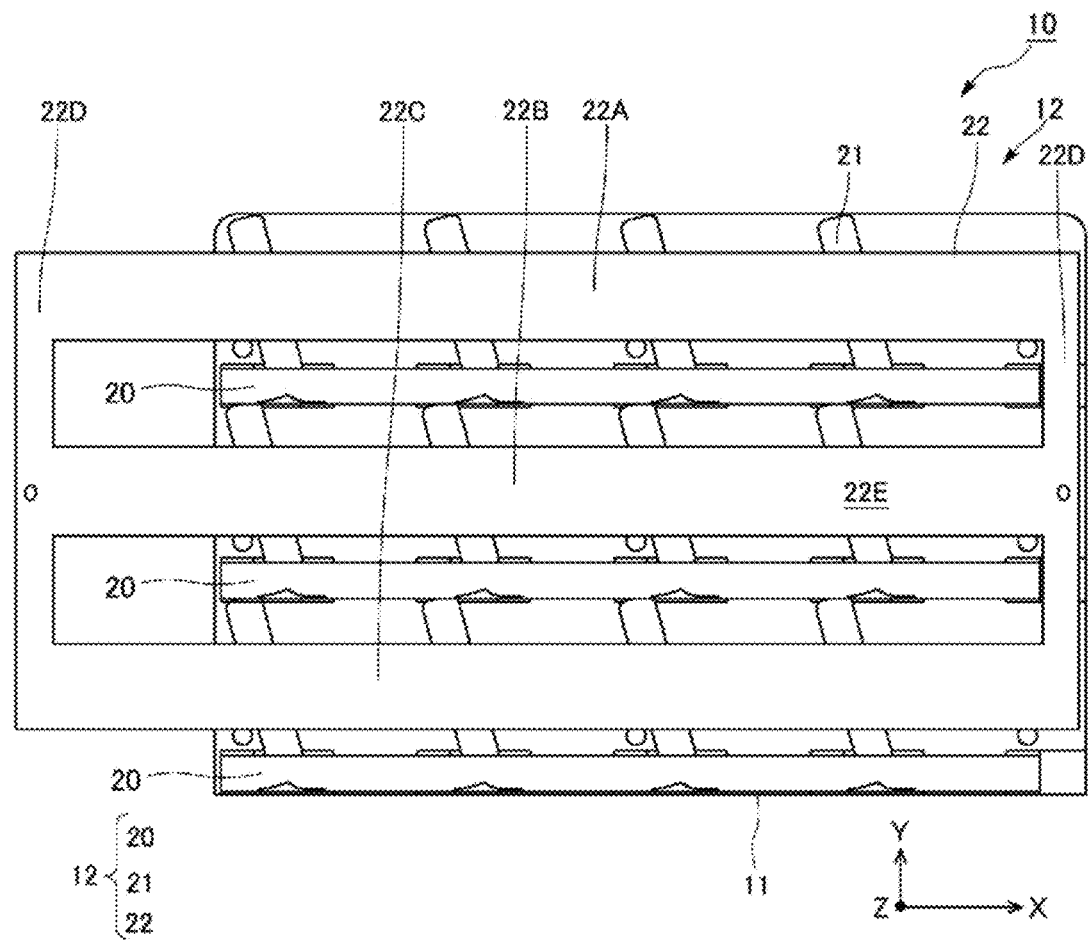
FIG. 6B is a plan view (part 6) schematically illustrating the impact absorption device according to the first embodiment.

Next, the operation of the impact absorption device 10 according to the present embodiment will be described with reference to FIGS. 3A to 6B. FIGS. 3A to 4B illustrate a state in which the impact absorbing portion 12 is being switched from the retracted state to the protruding state. FIGS. 3A and 3B are perspective views schematically illustrating an appearance of the impact absorption device 10, and FIGS. 4A and 4B are plan views schematically illustrating the appearance of the impact absorption device 10. FIGS. 5A to 6B illustrate a state in which the impact absorbing portion 12 is completely switched from the retracted state to the protruding state. FIGS. 5A and 5B are perspective views schematically illustrating the appearance of the impact absorption device 10, and FIGS. 6A and 6B are plan views schematically illustrating the appearance of the impact absorption device 10. Note that, in FIGS. 3A, 4A, 5A, and 6A, the top plate portion 22 is omitted for description.

As illustrated in FIGS. 3B and 4B, the top plate portion 22 is moved in the negative direction of the X-axis from the retracted state. This movement operation of the top plate portion 22 is caused by driving the top plate portion 22 in the negative direction of the X-axis by the drive unit. For example, a solenoid, a motor, an electromagnet or the like is used for the drive unit, and the drive unit is connected to the connecting portion 22D on the negative side of the X-axis of the top plate portion 22 through a string or a rod. The top plate portion 22 moves in the negative direction of the X-axis by the drive unit pulling this string or rod in the negative direction of the X-axis. The top plate portion 22 is moved to rotationally drive each fin 21 in the activating direction. With the fin 21 being rotationally driven in the activating direction, the impact absorbing member 20 to be erected is pushed up, causing the impact absorbing member 20 to rotate in the activating direction of the pivoting axis 20A. As illustrated in FIGS. 5A to 6B, with the impact absorbing members 20 and the fins 21 being brought to the standing posture, the impact absorbing portion 12 is switched to the protruding state. Note that the impact absorbing portion 12 is formed with a height (length in the Z-axis direction) of the impact absorbing member 20 from the base portion 11 in the protruding state being higher than that of the fin 21.

As illustrated in FIG. 5A, the impact absorption device 10 according to the present embodiment includes a restricting portion 13 configured to restrict rotation in the activating direction about the pivoting axis 20A when the impact absorbing member 20 is switched from the lying posture to the standing posture. In the present embodiment, one impact absorbing member 20 has five pivoting axis centers (not illustrated), and a restricting portion 13 is provided for each of the arrangement positions of the pivoting axis centers. The restricting portion 13 prevents the impact absorbing member 20 in the standing posture from further rotating in the activating direction.

Further, as illustrated in FIG. 6A, the fin 21 includes an abutment portion 21B (an example of a "first abutment portion") configured to abut against the impact absorbing member 20 to be erected when the fin 21 is switched to the standing posture. In FIG. 6A, the abutment portion 21B of the fin 21 in the second row and the first column is denoted by a reference sign, but all fins 21 include the abutment portion 21B. The abutment portion 21B restricts the impact absorbing member 20 in the standing posture from rotating in the standing-to-lying direction.

As illustrated in FIGS. 4A and 6A, the fin 21 includes an abutment portion 21C configured to abut against the impact absorbing member 20 of another column adjacent to the impact absorbing member 20 to be erected when the fin 21 is switched to the standing posture. In FIG. 6A, the abutment portion 21C of the fin 21 in the second row and the first column is denoted by a reference sign, but at least the fins 21 in the second column and the third column each include the abutment portion 21C.

Further, as illustrated in FIGS. 4A and 6A, the impact absorbing member 20 includes a groove portion 20B which suppresses interference with the abutment portion 21C of the fin 21 in the process of switching the fin 21 from the lying posture to the standing posture. The groove portion 20B is formed on a side surface of the impact absorbing member 20 corresponding to each abutment portion 21C. The groove portion 20B is formed along the movement locus of the abutment portion 21C when the fin 21 is moved. Thus, the abutment portion 21C of the fin 21 prevents the impact absorbing member 20 in another column adjacent to the impact absorbing member 20 to be erected by the fin 21 from being hindered in rotation by the abutment portion 21C.

As illustrated in FIG. 6A, the fins 21 in the second and third columns are intermediate fins 210 arranged between the impact absorbing member 20 to be erected and the impact absorbing member 20 in another column adjacent to the impact absorbing member 20 to be erected. With the intermediate fin 210 in the standing posture, the impact absorbing member 20 to be erected abuts against the abutment portion 21B of the intermediate fin 210, and the impact absorbing member 20 in another column adjacent to the impact absorbing members 20 to be erected abuts against the abutment portion 21C of the intermediate fin 210. Thus, the intermediate fin 210 in the standing posture can support the impact absorbing members 20 to be erected and the impact absorbing members 20 in another column adjacent to the impact absorbing members 20 to be erected.

As illustrated in FIGS. 2B, 4B, and 6B, the top plate portion 22 includes a plate-shaped portion 22E formed substantially flat. The plate-shaped portion 22E is a portion disposed on a front surface side of the top plate portion 22 so as to face an occupant. The top plate portion 22 is driven by the drive unit while maintaining the plate-shaped portion 22E parallel to the base portion 11. The plate-shaped portion 22E functions as a surface that receives the occupant's body. The plate-shaped portion 22E reduces the possibility of occupant injury. Note that the top plate portion 22 needs only at least the plate-shaped portion 22E having flexibility in order to reduce the possibility of occupant injury.

As described above, since the impact absorbing portion 12 of the impact absorption device 10 according to the present embodiment can be switched between the retracted state and the protruding state, the impact absorbing portion 12 can be maintained in the retracted state when not activated to prevent the impact absorbing portion 12 from being bulky, and the impact absorption device 10 can be arranged in a cabin or the like. Thus, the impact absorption device 10 according to the present embodiment can be arranged in a more flexible manner. Further, since the impact absorbing portion 12 has flexibility, the impact absorption device 10 can return to its original shape even after the top plate portion 22 receives the occupant, and can be repeatedly used because the impact absorption device 10 is switchable between the protruding state and the retracted state. Note that, in the impact absorption device 10, when the drive unit activates the impact absorbing portion 12, the impact absorbing portion 12 may be switched from the retracted state to the protruding state and may be switched from the protruding state to the retracted state manually by an occupant. Alternatively, the drive unit may perform driving for switching the impact absorbing portion 12 from the protruding state to the retracted state. For example, the drive unit may include an elastic member configured to bias the top plate portion 22 in the positive X-axis direction and, when switching from the protruding state to the retracted state, the top plate portion 22 may be moved in the positive X-axis direction by releasing the extension state of a string (not illustrated) attached to the top plate portion 22, to switch the impact absorbing portion 12 to the retracted state. Further, drive units configured to drive the impact absorbing member 20 and the fin 21 separately may be used, or the impact absorbing member 20 and the fin 21 may be driven together by one drive unit.

Modified Examples

Next, the impact absorption device 10 according to the present embodiment will be described. The impact absorption device 10 according to the present modified example has a configuration (structure) for preventing the impact absorbing member 20 from falling toward the retracted state when a load is applied to the impact absorbing member 20 in the protruding state.

Figure 7:
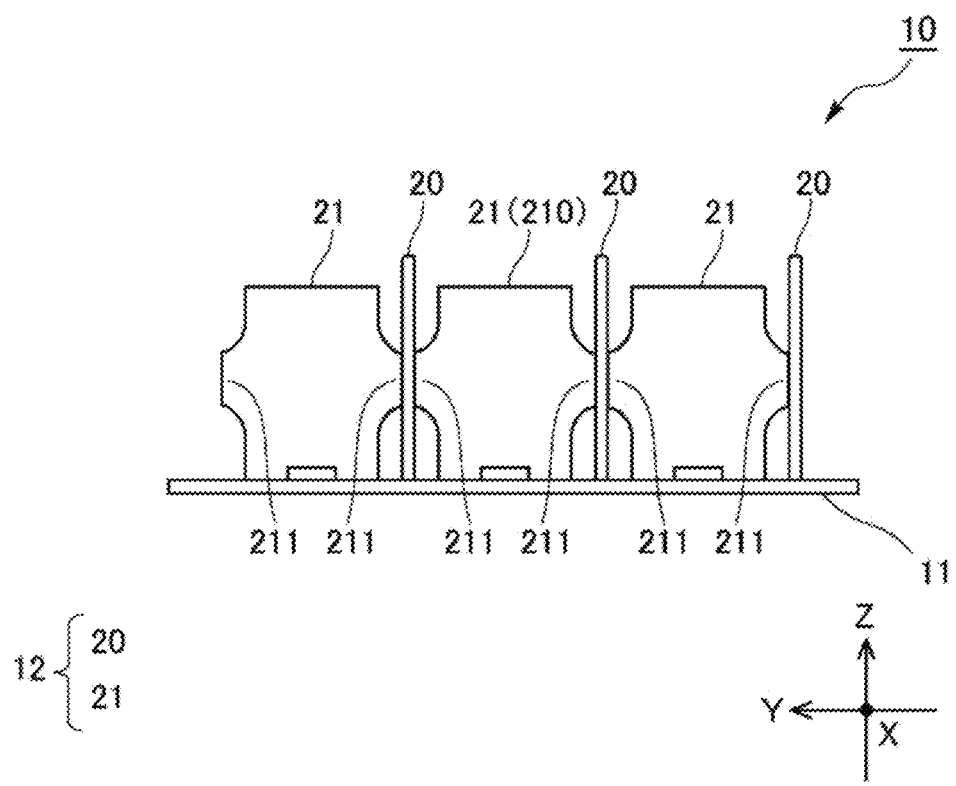
FIG. 7 is a schematic view (part 1) illustrating an example of an impact absorbing member and a fin of the impact absorption device according to a modified example of the first embodiment.

FIG. 7 is a schematic view of the impact absorption device 10 according to the present modified example when viewed from the negative side toward the positive side of the X-axis. In the protruding state of the impact absorbing portion 12, the impact absorbing member 20 and the fin 21 face each other, and the impact absorbing member 20 engages with the fin 21 by being deformed when receiving a load including a component in a direction (negative direction of the Z-axis) opposite to the front surface side of the base portion 11. The fin 21 includes a protruding portion 211 formed at a position facing the impact absorbing member 20 in the protruding state and protruding in either the positive or negative direction of the Y-axis. In the example illustrated in FIG. 7, the protruding portion 211 is formed on both sides of the fin 21. For example, when the fin 21 is the intermediate fin 210 illustrated in FIG. 6, the fin 21 faces the impact absorbing members 20 in the adjacent rows on both sides in the protruding state, and the pair of protruding portions 211 formed on both sides face the impact absorbing members 20 in the adjacent columns on both sides. Note that the fin 21 need only have at least the protruding portion 211 on the negative side of the Y-axis. Further, the impact absorbing member 20 and the fin 21 can be set at a right angle or an angle close to a right angle with respect to the base portion 11 in the protruding state. In the present modified example, preferably the direction (first direction) in which the pivoting axis of the impact absorbing member 20 extends and the direction (second direction) in which the pivoting axis of the fin extends are orthogonal to each other. In addition, considering that the impact absorbing member 20 first deforms when receiving an impact, the impact absorbing member 20 may have greater flexibility than the fin 21 in terms of impact relieving at the time of contact with the impact absorbing member 20.

Figure 8:
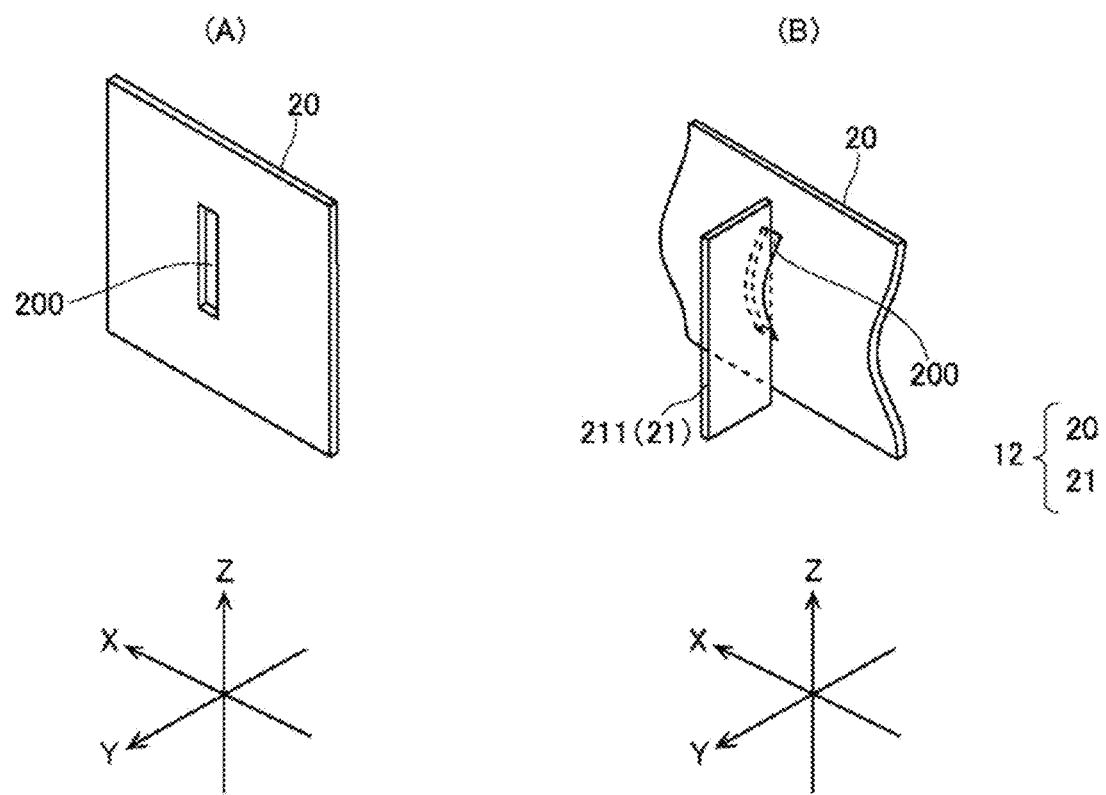
FIG. 8 is a schematic view (part 2) illustrating an example of the impact absorbing member and the fin of the impact absorption device according to a modified example of the first embodiment.

FIGS. 8(A) and 8(B) are schematic views illustrating a portion of the impact absorbing member 20 that faces one fin 21. FIG. 8(A) illustrates a portion of the impact absorbing member 20 in a state in which no load is applied. The impact absorbing member 20 includes a groove 200 (an example of a "first groove") formed at a position facing the fin 21 in the protruding state and engageable with a portion of the fin 21. The groove 200 is formed into, for example, a rectangular shape having a longitudinal direction along the Z-axis, and is formed to penetrate the impact absorbing member 20. In the example illustrated in FIG. 8(A), the groove 200 is formed with its center disposed in the Z-axis direction of the impact absorbing member 20. Note that the groove 200, as long as engageable with the fin 21, may be formed without penetrating the impact absorbing member 20.

FIG. 8(B) is a schematic view illustrating a state in which the impact absorbing member 20 is engaged with the protruding portion 211 of the fin 21 when a load is applied to the impact absorbing member 20. In FIG. 8(B), only the protruding portion 211 is extracted from the fin 21, and the protruding portion 211 is schematically illustrated as a rectangular plate shape. A height of the impact absorbing member 20 from the installation surface of the base portion 11 is higher than that of the fin 21 and thus, when a load is applied in the negative direction of the Z-axis to the impact absorbing portion 12, the impact absorbing member 20 first receives the load and deforms. As illustrated in FIG. 8(B), when the impact absorbing member 20 receives a load in the negative direction of the Z-axis, a portion of the impact absorbing member 20 including the groove 200 deforms toward the fin 21, engaging the groove 200 with the protruding portion 211 of the fin 21. Accordingly, when the impact absorbing member 20 receives a load in the protruding state, the fin 21 restricts the rotation about the pivoting axis 21A (refer to FIG. 2A and the like) and the switching to the retracted state. Therefore, even when a load is applied, the standing posture of the impact absorbing member 20 is maintained. Note that the groove 200 need only be engaged with a portion of the fin 21, and the fin 21 need not be provided with the protruding portion 211.

Figure 9:
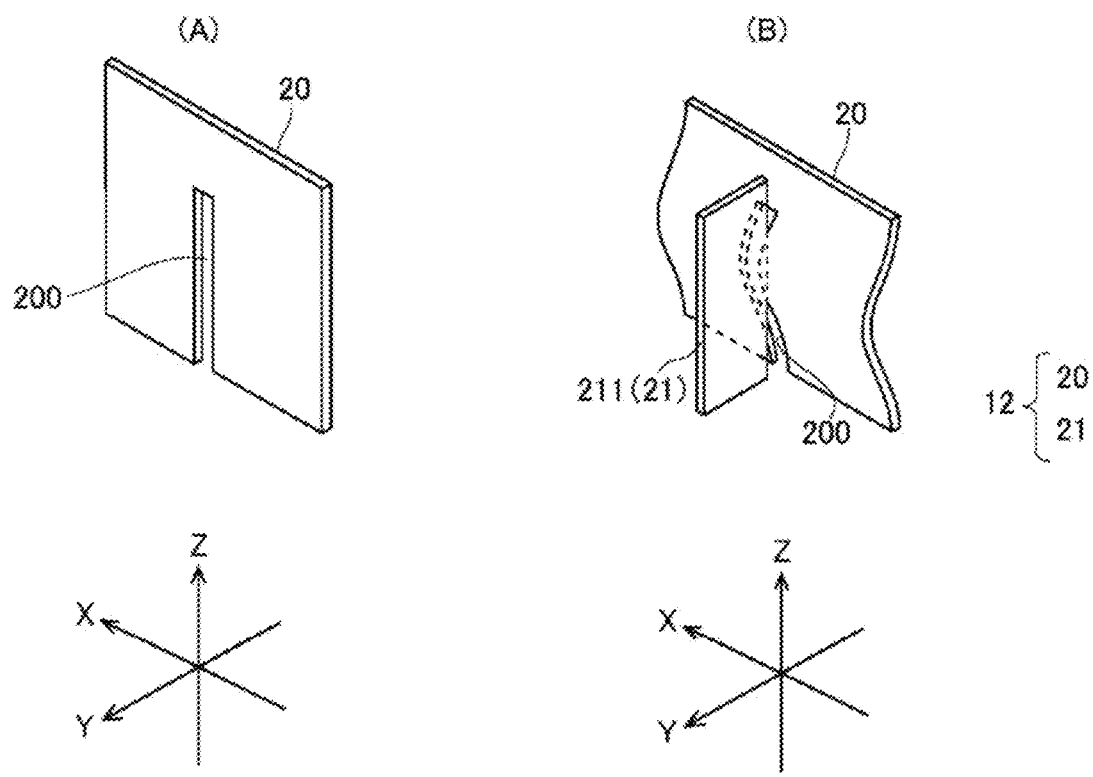
FIG. 9 is a schematic view (part 3) illustrating an example of the impact absorbing member and the fin of the impact absorption device according to a modified example of the first embodiment.

FIGS. 9(A) and 9(B) are schematic views illustrating another example of the groove 200. As in FIGS. 8(A) and 8(B), FIGS. 9(A) and 9(B) illustrate a portion of the impact absorbing member 20 that faces one fin 21. FIG. 9(A) illustrates a portion of the impact absorbing member 20 in a state in which no load is applied. In this example, the groove 200 is formed to a length that reaches a lower portion of the impact absorbing member 20. The groove 200 is formed in a rectangular shape having a longitudinal direction along the Z-axis, and is formed to penetrate the impact absorbing member 20 and reach the lower portion of the impact absorbing member 20.

FIG. 9(B) is a schematic view illustrating a state in which the impact absorbing member 20 is engaged with the protruding portion 211 of the fin 21 when a load is applied to the impact absorbing member 20. In FIG. 9(B), only the protruding portion 211 is extracted from the fin 21, and the protruding portion 211 is schematically illustrated as a rectangular plate shape. As illustrated in FIG. 9(B), when the impact absorbing member 20 receives a load in the negative direction of the Z-axis, a portion of the impact absorbing member 20 including the groove 200 deforms toward the fin 21, engaging the groove 200 with the protruding portion 211 of the fin 21. As described above, the groove 200, as long as engageable with a portion of the fin 21, may be formed at any position. Note that the shape of the groove 200 is not limited to a rectangular shape, and may be an oval shape (track shape), an elliptical shape, or another shape as long as the groove 200 is engageable with a portion of the fin 21.

Thus, when the impact absorbing member 20 receives a load in the protruding state, the fin 21 restricts rotation about the pivoting axis 21A (refer to FIG. 2A and the like) and the switching to the retracted state. Accordingly, even when a load is applied, the standing posture of the impact absorbing member 20 is maintained. The impact absorption device 10 according to the present modified example can prevent the impact absorbing member 20 from falling toward the retracted state when a load is applied to the impact absorbing member 20. Note that, in the protruding state of the impact absorbing portion 12, the impact absorbing member 20 does not necessarily need to be in contact with the fin 21 as long as the impact absorbing member 20 is engageable with the fin 21 after the impact absorbing member 20 receives a load and deforms. Therefore, the front surface of the impact absorbing member 20 and a side surface of the fin 21 need only face each other in the protruding state of the impact absorbing portion 12. In this case, for example, the impact absorbing member 20 and the fin 21 may be driven by separate drive units. Note that the fin 21 is driven in synchronization with the impact absorbing member 20.

Figure 10:
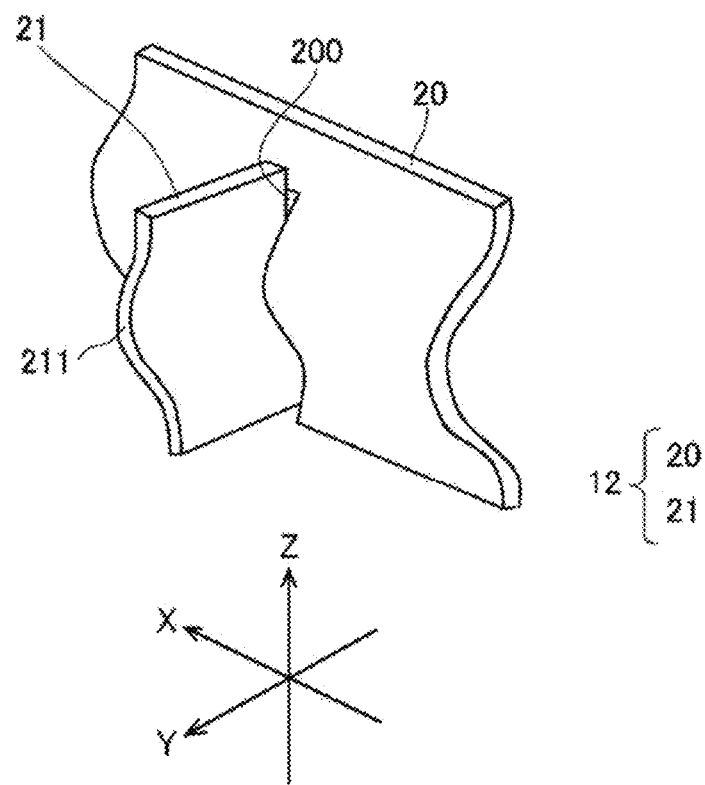
FIG. 10 is a schematic view (part 4) illustrating an example of the impact absorbing member and the fin of the impact absorption device according to a modified example of the first embodiment.
Figure 11:
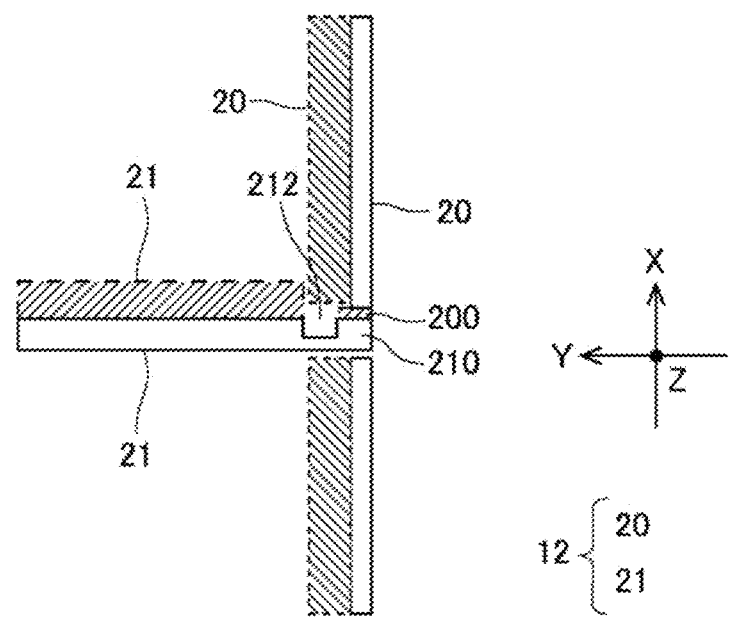
FIG. 11 is a schematic view (part 5) illustrating an example of the impact absorbing member and the fin of the impact absorption device according to a modified example of the first embodiment.

FIG. 10 is a schematic view illustrating one fin 21 and a portion of the impact absorbing member 20 facing the fin 21. FIG. 10 illustrates a state in which a load is applied in the negative direction of the Z-axis to the impact absorbing member 20 and the fin 21. FIG. 11 is a schematic view of the state illustrated in FIG. 10, as viewed from above. In FIG. 11, a groove 212 (an example of a "second groove") is also formed in the fin 21 in addition to the groove 200 of the impact absorbing member 20. When the impact absorbing member 20 and the fin 21 receive a load in the negative direction of the Z-axis, in the present example, the impact absorbing member 20 deforms in the positive direction of the Y-axis (an example of the "second direction being predetermined"), and the fin 21 also deforms in the positive direction of the X-axis. In FIG. 11, the impact absorbing member 20 and the fin 21 before deformation are indicated by solid lines, the impact absorbing member 20 and the fin 21 after deformation are indicated by dashed lines, and the deformed portions are filled with hatching.

As illustrated in FIG. 11, the fin 21 includes the groove 212 engageable with the impact absorbing member 20 by being deformed and thus sandwiching a portion of the impact absorbing member 20 deformed into a protruding shape when receiving a load in the negative direction of the Z-axis. When receiving a load, the impact absorbing member 20 partially deforms into a protruding shape in the positive direction of the Y-axis, sandwiching the fin 21. Furthermore, when the fin 21 also deforms, the impact absorbing member 20 is sandwiched by the groove 212 of the fin 21. The groove 212 is formed in the protruding portion 211 and, before deformation, faces a side surface of the groove 200 in the groove 200 of the impact absorbing member 20. When the impact absorbing member 20 and the fin 21 deform, the groove 212 engages with the side surface of the groove 200 in the impact absorbing member 20, causing the impact absorbing member 20 and the fin 21 to support each other. Thus, when the impact absorbing member 20 receives a load, the impact absorbing member 20 is restricted from being switched to the retracted state. The impact absorption device 10 can efficiently absorb the impact received by the impact absorbing member 20.

Figure 12:
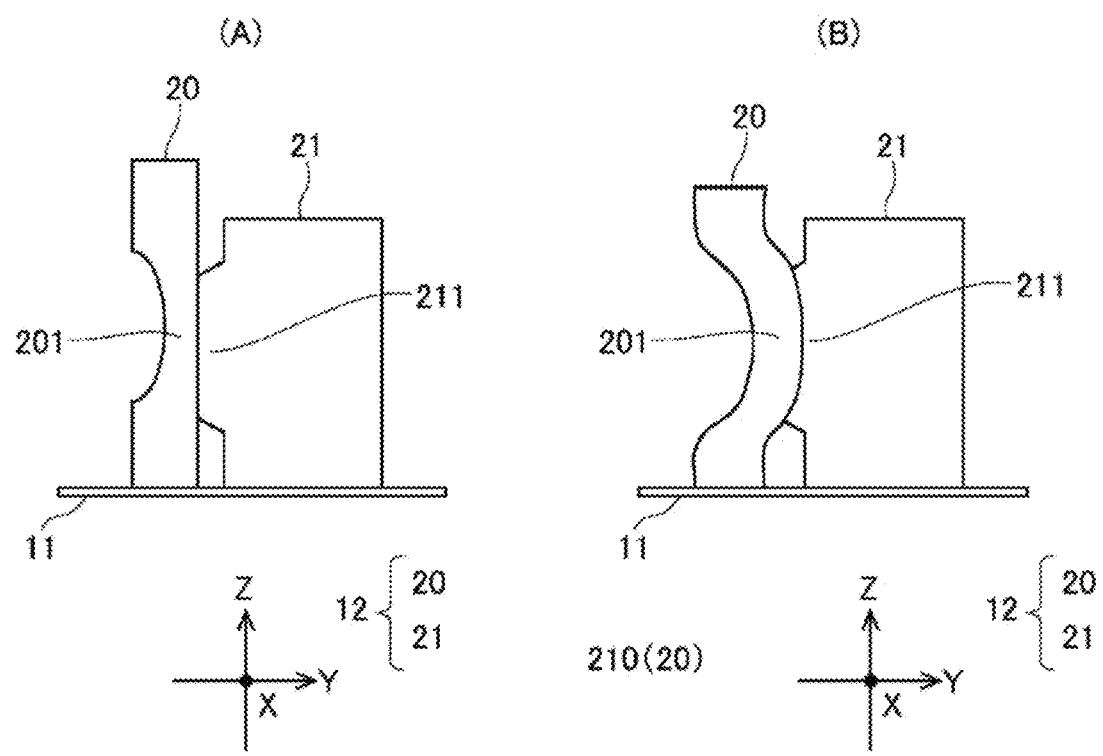
FIG. 12 is a schematic view (part 6) illustrating an example of the impact absorbing member and the fin of the impact absorption device according to a modified example of the first embodiment.

FIGS. 12(A) and 12(B) are each a schematic view illustrating one fin 21 and a portion of the impact absorbing member 20 facing the fin 21. FIGS. 12(A) and 12(B) each illustrate a state in which the impact absorption device 10 is viewed from the positive side toward the negative side of the X-axis. FIG. 12(A) illustrates the impact absorbing member 20 in a state in which no load is applied. FIG. 12(B) illustrates a state in which the impact absorbing member 20 is engaged with the protruding portion 211 of the fin 21 when a load is applied to the impact absorbing member 20 from the state illustrated in FIG. 12(A). The impact absorbing member 20 includes a deformation support portion 201 formed on the negative side of the Y-axis of the impact absorbing member 20, and thus preferentially deforms in the positive direction of the Y-axis when receiving a load in the negative direction of the Z-axis. The deformation support portion 201 is formed on the entire impact absorbing member 20 in the X-axis direction.

In this example, the deformation support portion 201 is a thinned part formed on the side surface of the impact absorbing member 20, extending in the X-axis direction. When a load is applied to the impact absorbing member 20 in which the deformation support portion 201 is formed, the deformation support portion 201, which is a thinned part, cannot support the input load. Therefore, the impact absorbing member 20 readily deforms in the positive direction of the Y-axis, which is opposite to the side on which the deformation support portion 201 is formed. In the positive direction of the Y-axis of the impact absorbing member 20, the fin 21 to be engaged with the impact absorbing member 20 is arranged. Therefore, the impact absorbing member 20 always deforms in the same direction after receiving a load, and readily engages with the fin 21.

Figure 13:
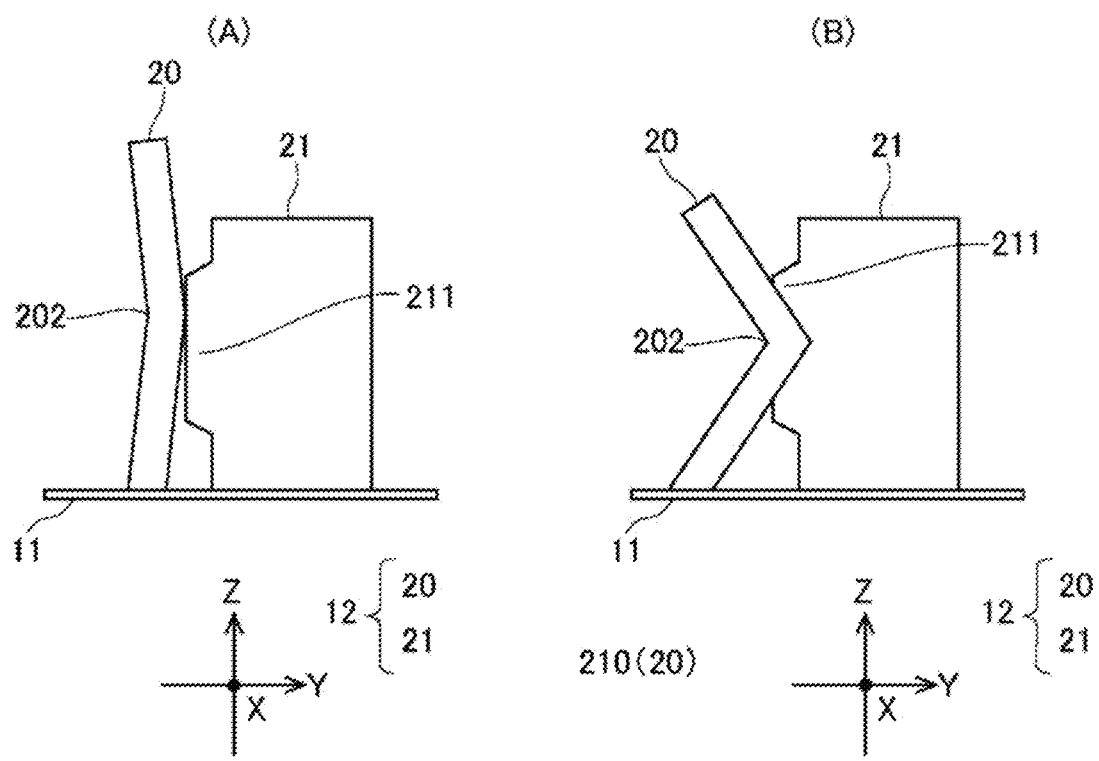
FIG. 13 is a schematic view (part 7) illustrating an example of the impact absorbing member and the fin of the impact absorption device according to a modified example of the first embodiment.

Alternatively, the deformation support portion may be formed by deforming the impact absorbing member 20 in advance. FIGS. 13(A) and 13(B) are each a schematic view illustrating one fin 21 and a portion of the impact absorbing member 20 facing the fin 21. FIGS. 13(A) and 13(B) each illustrate a state in which the impact absorption device 10 is viewed from the positive side toward the negative side of the X-axis. FIG. 13(A) illustrates the impact absorbing member 20 in a state in which no load is applied. FIG. 13(B) illustrates a state in which the impact absorbing member 20 is engaged with the protruding portion 211 of the fin 21 when a load is applied to the impact absorbing member 20 from the state illustrated in FIG. 13(A). The impact absorbing member 20 includes a deformation support portion 202 configured to deform in advance toward the positive side of the Y-axis of the impact absorbing member 20, and thus preferentially deforms in the positive direction of the Y-axis when receiving a load in the negative direction of the Z-axis. The deformation support portion 202 is formed on the entire impact absorbing member 20 in the X-axis direction.

In this example, the deformation support portion 202 is an area that extends in the X-axis direction on the side surface of the impact absorbing member 20 and is deformed in advance toward the positive side of the Y-axis. With such a deformation support portion 202 being formed on the impact absorbing member 20, the impact absorbing member 20 can be always deformed in the positive direction of the Y-axis when a load is applied to the impact absorbing member 20. Note that the deformation support portion may be formed on the fin 21. For example, as in the examples illustrated in FIGS. 10 and 11, when the fin 21 is desirably deformed in the positive direction of the X-axis, the deformation support portion can be formed accordingly and thus cause the fin 21 to deform in the positive direction.

Figure 14:
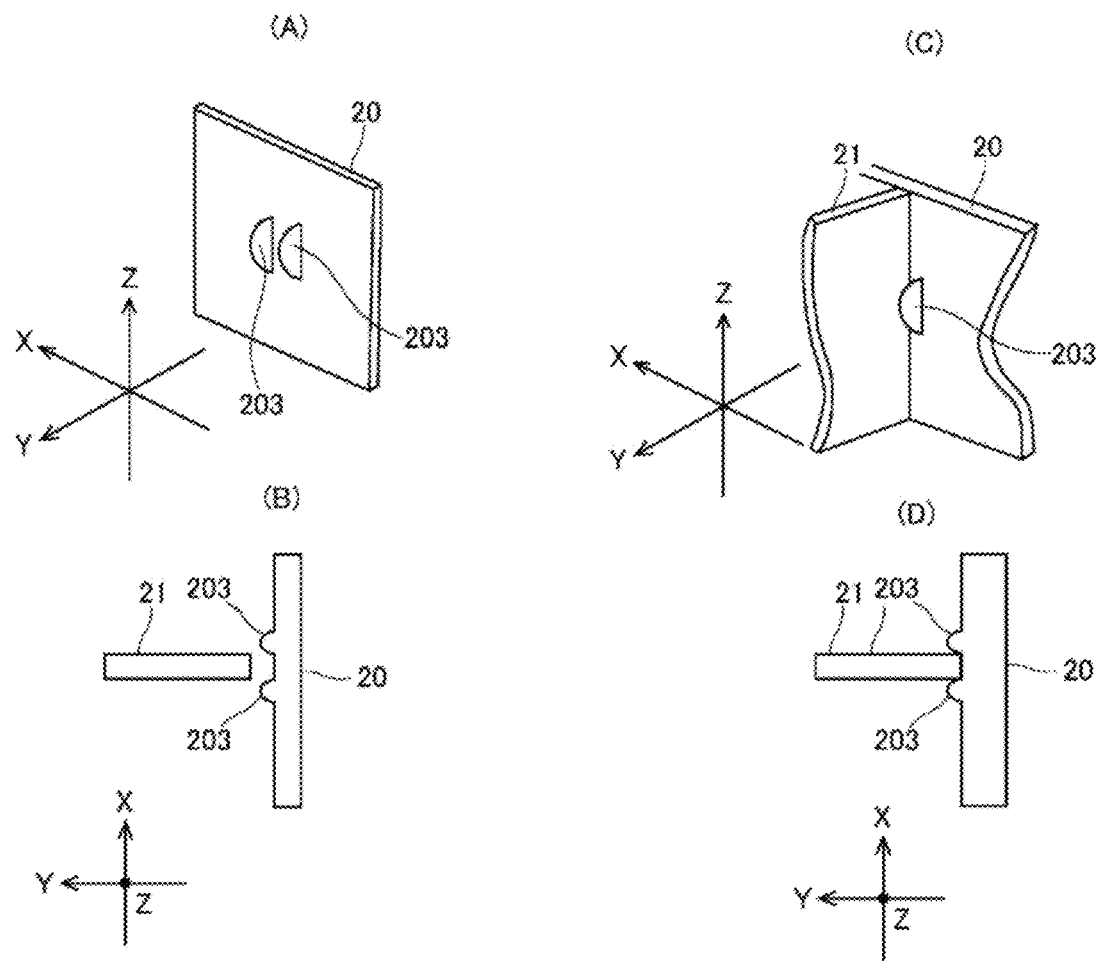
FIG. 14 is a schematic view (part 8) illustrating an example of the impact absorbing member and the fin of the impact absorption device according to a modified example of the first embodiment.

Next, another example of the impact absorbing member 20 will be described with reference to FIG. 14. FIGS. 14(A) and 14(B) each illustrate a portion of the impact absorbing member 20 before deformation. FIG. 14(A) is a perspective view of the impact absorbing member 20, and FIG. 14(B) is a schematic view of the impact absorbing member 20 and the fin 21 facing the impact absorbing member 20, as viewed from above.

In this example, a pair of projections 203 having a hemispherical shape are formed on the surface of the impact absorbing member 20 on the side facing the fin 21. The pair of projections 203 are arranged with a gap therebetween to such an extent that the fin 21 is engageable therebetween. A protruding amount of the projection 203 from the surface of the impact absorbing member 20 is set to such an extent that the engagement with the impact absorbing member 20 is not released when the fin 21 is sandwiched between the projections. When the projection 203 protrudes unnecessarily, the impact absorbing member 20 becomes bulky in the retracted state, and therefore the protruding amount of the projection 203 is set in consideration of the engaged state and the retracted state.

As illustrated in FIG. 14(B), when the impact absorbing member 20 and the fin 21 are in the protruding state, an end portion of the fin 21 is positioned between the two projections 203. To ensure a margin of deformation of the impact absorbing member 20 when a load is applied in the negative direction of the Z-axis to the impact absorbing member 20, preferably the impact absorbing member 20 does not come into contact with the fin 21 in the protruding state. In this case, for example, the impact absorbing member 20 and the fin 21 are driven by separate drive units.

FIGS. 14(C) and 14(D) each illustrate a portion of the impact absorbing member 20 after deformation. FIG. 14(C) is a perspective view of the impact absorbing member 20, and FIG. 14(D) is a schematic view of the impact absorbing member 20 and the fin 21 facing the impact absorbing member 20, as viewed from above.

FIGS. 14(C) and 14(D) each illustrate a state in which a load is applied to the impact absorbing member 20 in the negative direction of the Z-axis and the impact absorbing member 20 is deformed. In this state, the impact absorbing member 20 which had been separated comes into contact with the fin 21, and the two projections 203 deform, sandwiching the fin 21. Note that, in the state illustrated in FIGS. 14(C) and 14(D), the fin 21 also starts deformation in a state of being sandwiched between the two projections. Note that, the two projections 203 preferably are formed at positions where the deformation amount of the impact absorbing member 20 when deformed is largest, and preferably have a hemispherical shape and thus do not hinder deformation of the impact absorbing member 20. For example, when the projection 203 is formed in a shape elongated in the Z-axis direction, a rigidity of the impact absorbing member 20 in the Z-axis direction increases, and the impact absorbing member 20 is less likely to deform in the Z-axis direction, which is not preferable.

Further, as illustrated in FIG. 14(D), a portion of the impact absorbing member 20 deforms, approaching and coming into contact with the fin 21. When the two projections 203 sandwich the fin 21, the impact absorbing member 20 and the fin 21 are engaged. Note that, as deformation progresses, areas of the fin 21 other than the portion sandwiched between the two projections 203 may deform or may shrink.

As described above, the impact absorbing member 20 and the fin 21 may be configured to be engageable with each other by providing the projection 203 instead of the groove to the impact absorbing member 20. In this example as well, when the impact absorbing member 20 receives a load in the protruding state, the standing state of the fin 21 is maintained and the fin 21 restricts the impact absorbing member 20 from switching to the retracted state.

Figure 15:
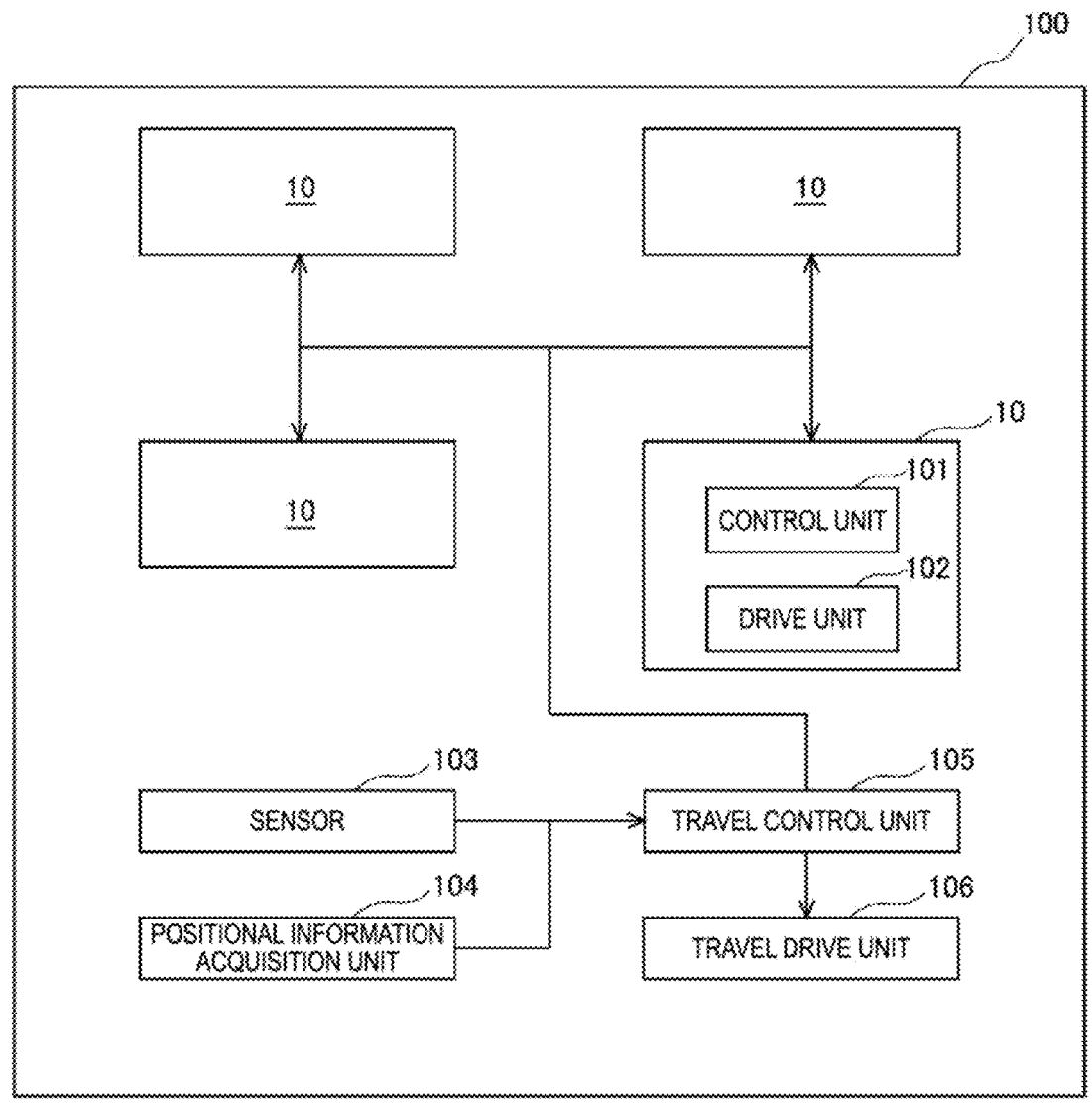
FIG. 15 is a block diagram of the impact absorption device according to the first embodiment.
Figure 16:
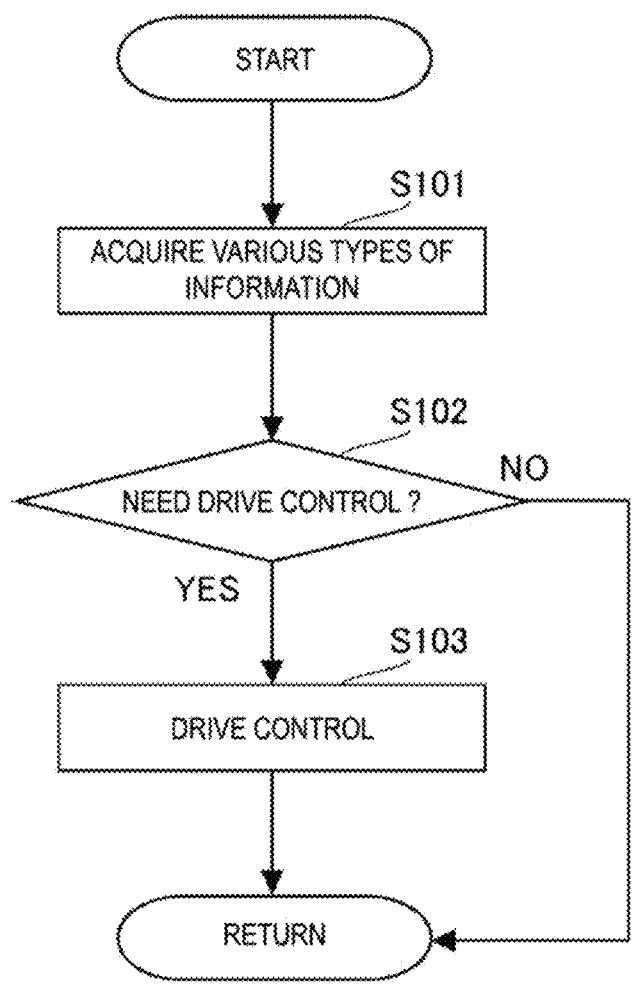
FIG. 16 is a flowchart of processing executed by a control unit of the impact absorption device according to the first embodiment.

Next, the drive control of the impact absorption device 10 will be described with reference to FIGS. 15 and 16. For example, the impact absorption device 10 is driven, switching the impact absorbing member 20 from the retracted state to the protruding state, when a signal indicating a sudden deceleration of a vehicle or a movement of the occupant due to an inertial force acting on the occupant is detected by a sensor or the like. FIG. 15 is a block diagram including a vehicle 100 in which the impact absorption device 10 is disposed. In the present embodiment, a plurality of the impact absorption devices 10 are mounted in the vehicle. For example, the impact absorption devices 10 may be arranged in a quantity equivalent to a maximum number of occupants of the vehicle 100, and may be arranged one per occupant. FIG. 15 illustrates four impact absorption devices 10 and representatively illustrates the function units of one impact absorption device 10. The impact absorption device 10 includes a control unit 101. The control unit 101 is constituted by, for example, a microcomputer, and executes each processing by causing a central processing unit (CPU; not illustrated) to execute a program stored in a storage means (read only memory (ROM)) or the like; not illustrated).

Furthermore, FIG. 15 illustrates a sensor 103, a positional information acquisition unit 104, a travel control unit 105, and a travel drive unit 106, which are mounted on the vehicle 100. First, the configuration related to the vehicle 100 will be described. The vehicle 100 is capable of automatic driving on a road in an appropriate manner as autonomous traveling while sensing its surroundings. Note that the vehicle 100 can of course be manually operated by a passenger. The sensor 103 is a means for sensing the surroundings of the vehicle 100 in order to acquire information necessary for autonomous traveling of the vehicle 100, and typically includes a stereo camera, a laser scanner, a LIDAR, various radars, or the like. The information acquired by the sensor 103 is transmitted to the travel control unit 105, and is used by the travel control unit 105 to recognize obstacles, pedestrians, and traffic lanes existing around the vehicle 100 and the like. In the present embodiment, the sensor 103 may include a visible light camera or an infrared camera for monitoring. The positional information acquisition unit 104 is a means for acquiring the current position of the vehicle 100, and typically includes a GPS receiver or the like. The information acquired by the positional information acquisition unit 104 is also transmitted to the travel control unit 105, and is used for predetermined processing such as, for example, the calculation of a route for the vehicle 100 to reach a destination by using the current position of the vehicle 100 and the calculation of a required time for reaching the destination.

The travel control unit 105 is a computer that controls the vehicle 100 based on information acquired from the sensor 103 and the positional information acquisition unit 104. The travel control unit 105 is constituted by, for example, a microcomputer, and achieves functions for performing various processes described above by causing a central processing unit (CPU; not illustrated) to execute a program stored in a storage means (read only memory (ROM) or the like; not illustrated).

A specific example of various processing by the travel control unit 105 includes processing such as: processing of generating a travel plan for the vehicle 100; processing of detecting predetermined data around the vehicle 100 necessary for autonomous driving, based on data acquired by the sensor 103; and processing of generating a control command for controlling autonomous traveling, based on a travel plan, predetermined data, and the position information of the vehicle 100 acquired by the positional information acquisition unit 104. The processing of generating a travel plan is processing of determining a travel route from a starting point to a destination. The processing of detecting predetermined data is processing for detecting, for example, the number and position of lanes, the number and position of other vehicles existing around the vehicle 100, the number and position of obstacles (e.g., pedestrians, bicycles, structures, buildings, or the like) existing around the vehicle 100, the structure of a road, a road sign, or the like. The control command is transmitted to the travel drive unit 106 described below. A known method may be employed for generating a control command for autonomous traveling of the vehicle 100.

The travel drive unit 106 is a means for driving the vehicle 100 based on a control command generated by the travel control unit 105. The travel drive unit 106 includes, for example, a motor for driving wheels, an engine, an inverter, a brake, a steering mechanism, or the like, and the motor, the brake, or the like are driven in accordance with a control command to achieve autonomous traveling of the vehicle 100.

Next, the details of the drive control will be described with reference to FIG. 16. FIG. 16 is a flowchart of the processing performed by the control unit 101. Note that this processing is repeatedly executed at predetermined intervals by the control unit 101. First, in S101, the control unit 101 acquires various types of information. Various types of information are transmitted from the travel control unit 105.

Next, in S102, the control unit 101 determines whether drive control is required. The control unit 101, when determining that the information indicating that the vehicle 100 has been rapidly decelerated is included in the various types of information acquired in S101, determines that drive control is necessary.

The control unit 101, when determining that the drive control is necessary in S102, executes the processing in S103. In S103, the control unit 101 executes drive control. For example, the drive unit 102 includes a solenoid, a motor, an electromagnet, or the like to drive the top plate portion 22. Thus, the impact absorption device 10 according to the present embodiment can switch the impact absorbing portion 12 from the retracted state to the protruding state. Note that the impact absorbing member 20 and the fin 21 may be separately driven in synchronization with each other.

Other Embodiments

Although the embodiments of the present disclosure have been described above, the various embodiments described above can be combined as much as possible.

In the first embodiment, the top plate portion 22 is integrally formed by connecting the coupling portions 22A, 22B, 22C to each other by the connecting portions 22D, but the coupling portions 22A, 22B, 22C are not connected to each other and the respective coupling portions 22A, 22B, 22C may be driven by the drive unit. In this case, the impact absorption device 10 includes a plurality of driving force transmitting members. Note that the drive unit may drive the fin 21 without providing the driving force transmitting member.

The impact absorption device 10 according to the first embodiment and the modified examples can be activated to avoid collision between the occupant and the vehicle components due to sudden braking of the vehicle even when the vehicle does not result in collision. Thus, the impact absorption device 10 can be activated every time the vehicle is suddenly braked. Note that the impact absorption device 10 can be attached to any part of the vehicle. For example, in a car, the impact absorption device 10 is attached on a dashboard lower panel covering a steering column shaft to protect an occupant seated in a driver's seat, on the back of a front seat back to protect a passenger seated in a rear seat, or inside a seat back to prevent a submarine phenomenon of an occupant seated in a seat, or the like. These impact absorption devices may also be attached outside the vehicle to protect the occupants of the vehicle in the event of a collision between the vehicle and roadside obstacles or other vehicles.

In addition, the impact absorption device 10 may be attached to a device other than the vehicle. For example, the impact absorption device 10 may be attached to a robot to protect the robot. The impact absorption device 10 may also be attached to a jacket to protect a wearer of the jacket in the event that the wearer falls.

Each aspect disclosed in the present specification can be combined with any other feature disclosed herein.

REFERENCE SIGNS LIST

10 Impact absorption device
11 Base portion
12 Impact absorbing portion
13 Restricting portion
20 Impact absorbing member
20A, 21A Pivoting axis
20B Groove portion
21 Fin
21B, 21C Abutment portion
22 Top plate portion
100 Vehicle
101 Control unit
102 Drive unit
103 Sensor
104 Positional information acquisition unit
105 Travel control unit
106 Travel drive unit
200 Groove
201, 202 Deformation support portion
203 Projection
210 Intermediate fin
211 Protruding portion
212 Groove

The invention claimed is:

1. An impact absorption device configured to relieve an impact when activated, the device comprising:
an impact absorbing member having flexibility and attached to a base portion in a manner reversibly switchable between a retracted state in which the impact absorbing member is retracted toward an installation surface of the base portion and a protruding state in which the impact absorbing member protrudes from the installation surface;
an auxiliary member having flexibility and attached to the base portion in a manner reversibly switchable between a retracted state in which the auxiliary member is retracted toward the installation surface and a protruding state in which the auxiliary member protrudes from the installation surface in synchronization with the retracted state and the protruding state of the impact absorbing member; and
a drive unit configured to directly or indirectly drive the impact absorbing member when the impact absorbing member and the auxiliary member are activated, thereby switching the impact absorbing member at least from the retracted state to the protruding state, wherein
the impact absorbing member is attached to the installation surface of the base portion rotatably about a first pivoting axis extending in a first direction, and is reversibly switched between the retracted state and the protruding state by being rotationally driven about the first pivoting axis,
the auxiliary member is attached to the installation surface rotatably about a second pivoting axis extending in a second direction intersecting the first direction, and is reversibly switched between the retracted state and the protruding state by being rotationally driven about the second pivoting axis,
a height of the impact absorbing member from the base portion in the protruding state is higher than that of the auxiliary member, and
in the protruding state, at least a portion of the impact absorbing member and at least a portion of the auxiliary member face each other, and the impact absorbing member deforms when receiving a load including a component in a direction opposite to the installation surface side of the base portion, thereby engaging with the auxiliary member.

2. The impact absorption device according to claim 1, wherein
the auxiliary member restricts the impact absorbing member from rotating about the first pivoting axis and switching to the retracted state when the impact absorbing member receives the load in the protruding state.

3. The impact absorption device according to claim 1, wherein
the impact absorbing member includes a first groove formed at a position facing the auxiliary member in the protruding state and engageable with a portion of the auxiliary member, and
at least a portion of the impact absorbing member deforms toward the auxiliary member when the impact absorbing member receives the load, thereby causing the first groove to engage with a portion of the auxiliary member.

4. The impact absorption device according to claim 3, wherein
the auxiliary member includes a protruding portion formed at a position facing the first groove in the protruding state and protruding in the second direction, and
the auxiliary member deforms in the first direction when the auxiliary member receives the load, thereby causing the protruding portion to engage with the first groove.

5. The impact absorption device according to claim 1, wherein
   a portion of the impact absorbing member deforms into a protruding shape in the second direction when the impact absorbing member receives the load, the second direction being predetermined, and
   the auxiliary member includes a second groove engageable with the impact absorbing member by being deformed and sandwiching the portion of the impact absorbing member deformed into the protruding shape when receiving the load.

6. The impact absorption device according to claim 5, wherein
   the impact absorbing member includes a deformation support portion formed in the first direction, causing deformation to preferentially occur in the second direction when the impact absorbing member receives the load.

7. The impact absorption device according to claim 5, wherein
   the impact absorbing member has greater flexibility than that of the auxiliary member.

8. The impact absorption device according to claim 1, wherein
   the impact absorbing member includes a plurality of impact absorbing members disposed in a plurality of columns, the plurality of impact absorbing members being spaced apart in a direction orthogonal to the first direction, and
   each of the plurality of impact absorbing members provided in the plurality of columns is
   maintained in a lying posture along the installation surface in the retracted state,
   rotationally driven in a predetermined activating direction about the first pivoting axis and switched from the lying posture to a standing posture in which the impact absorbing member is erected from the installation surface, when being switched from the retracted state to the protruding state, and
   rotationally driven in a standing-to-lying direction opposite to the activating direction about the first pivoting axis and switched from the standing posture to the lying posture, when being switched from the protruding state to the retracted state.

9. The impact absorption device according to claim 8, wherein
   the auxiliary member is
   disposed between each column of the plurality of impact absorbing members of the plurality of columns,
   maintained in a lying posture along the installation surface in the retracted state, with a portion of an impact absorbing member of the plurality of impact absorbing members in an adjacent column covering, from above, at least a portion of the auxiliary member,
   rotationally driven in a predetermined activating direction about the second pivoting axis and switched from the lying posture to a standing posture, when being switched from the retracted state to the protruding state, and
   rotationally driven in the standing-to-lying direction opposite to the activating direction about the second pivoting axis and switched from the standing posture to the lying posture, when being switched from the protruding state to the retracted state.

10. The impact absorption device according to claim 9, wherein
    the auxiliary member faces, of the plurality of impact absorbing members, impact absorbing members in adjacent columns on both sides, in the protruding state.

11. The impact absorption device according to claim 8, further comprising:
    one or more driving force transmitting members coupled to the auxiliary member, at least partially having flexibility, and driven by the drive unit, wherein
    the one or more driving force transmitting members are driven when the drive unit activates the impact absorbing member, thereby causing the auxiliary member to switch from the lying posture to the standing posture, and the impact absorbing member to switch from the lying posture to the standing posture, accompanying the auxiliary member.

12. The impact absorption device according to claim 11, comprising
    a plurality of the auxiliary members, and
    one of the driving force transmitting members, wherein
    the plurality of auxiliary members are coupled to the driving force transmitting member.

13. The impact absorption device according to claim 11, wherein
    the one or more driving force transmitting members each include a plate-shaped portion and is driven by the drive unit while maintaining a state in which the plate-shaped portion is parallel to the installation surface.

14. The impact absorption device according to claim 1, wherein
    the first direction and the second direction are orthogonal to each other.

* * * * *